(12) United States Patent
 Zebuhr

(10) Patent No.: US 9,770,676 B2
(45) Date of Patent: Sep. 26, 2017

(54) DISTILLER

(71) Applicant: Aquaback Technologies, Inc., Salem, NH (US)

(72) Inventor: William H. Zebuhr, Nashua, NH (US)

(73) Assignee: Aquaback Technologies, Inc., Salem, NH (US)

( * ) Notice: Subject to any disclaimer, the term of this patent is extended or adjusted under 35 U.S.C. 154(b) by 419 days.

(21) Appl. No.: 14/341,127

(22) Filed: Jul. 25, 2014

(65) Prior Publication Data

US 2014/0332365 A1    Nov. 13, 2014

Related U.S. Application Data

(62) Division of application No. 13/185,894, filed on Jul. 19, 2011, now Pat. No. 8,858,758.

(60) Provisional application No. 61/366,448, filed on Jul. 21, 2010.

(51) Int. Cl.
| | |
|---|---|
| *B01D 1/22* | (2006.01) |
| *C02F 1/08* | (2006.01) |
| *B01D 5/00* | (2006.01) |
| *B01D 1/28* | (2006.01) |
| *C02F 1/04* | (2006.01) |
| *C02F 103/08* | (2006.01) |

(52) U.S. Cl.
CPC ............ *B01D 5/009* (2013.01); *B01D 1/225* (2013.01); *B01D 1/227* (2013.01); *B01D 1/2887* (2013.01); *B01D 5/006* (2013.01); *C02F 1/042* (2013.01); *C02F 1/08* (2013.01); *C02F 2103/08* (2013.01)

(58) Field of Classification Search
CPC ...... B01D 1/227; B01D 1/2887; B01D 5/006; C02F 1/042; C02F 1/08; C02F 2103/08
See application file for complete search history.

(56) References Cited

U.S. PATENT DOCUMENTS

| | | |
|---|---|---|
| 2,546,381 A | 3/1951 | Zahm |
| 3,090,732 A | 5/1963 | Werner et al. |
| 3,190,817 A | 6/1965 | Neugebauer et al. |
| 3,274,076 A | 9/1966 | Ridgway |
| 3,434,935 A | 3/1969 | Fischer et al. |
| 3,477,491 A | 11/1969 | Weaver et al. |

(Continued)

FOREIGN PATENT DOCUMENTS

| | | |
|---|---|---|
| CN | 2080416 | 7/1991 |
| CN | 1391969 | 1/2003 |

(Continued)

OTHER PUBLICATIONS

Invitation to Pay Additional Fees and, Where Applicable, Protest Fee with Annex of Communication Relating to the Results of the Partial International Search, for PCT/US2011/044497, Title: Distiller; Date of mailing Oct. 20, 2011.

(Continued)

*Primary Examiner* — Jonathan Miller
(74) *Attorney, Agent, or Firm* — Hamilton, Brook, Smith & Reynolds, P.C.

(57) ABSTRACT

A distiller including an evaporator having at least one evaporation surface for evaporating liquid into vapor. At least one movable liquid applicator assembly has a wiper applicator which can move over the at least one evaporation surface, for wiping and applying a thin even film of the liquid on the at least one evaporation surface for evaporation.

20 Claims, 22 Drawing Sheets

(56) References Cited

U.S. PATENT DOCUMENTS

| | | | |
|---|---|---|---|
| 3,695,327 A | 10/1972 | Widmer | |
| 3,764,483 A | 10/1973 | Tleimat | |
| 3,848,289 A | 11/1974 | Bachmann | |
| 4,255,232 A | 3/1981 | Ries | |
| 4,321,106 A | 3/1982 | Burkhard et al. | |
| 4,334,952 A | 6/1982 | Tkac et al. | |
| 4,361,462 A | 11/1982 | Fujii et al. | |
| 4,500,390 A | 2/1985 | Tkac et al. | |
| 4,671,856 A * | 6/1987 | Sears | B01D 1/221 159/24.2 |
| 6,238,524 B1 | 5/2001 | Zebuhr | |
| 6,261,419 B1 | 7/2001 | Zebuhr | |
| 6,319,408 B1 | 11/2001 | Zebuhr | |
| 6,328,536 B1 | 12/2001 | Zebuhr | |
| 6,423,187 B1 | 7/2002 | Zebuhr | |
| 6,592,338 B2 | 7/2003 | Zebuhr | |
| 6,602,060 B2 | 8/2003 | Zebuhr | |
| 6,627,047 B1 | 9/2003 | Ijiri et al. | |
| 6,689,251 B2 | 2/2004 | Zebuhr | |
| 6,695,951 B1 | 2/2004 | Bitterly et al. | |
| 6,802,941 B2 | 10/2004 | Zebuhr | |
| 6,846,387 B1 | 1/2005 | Zebuhr | |
| 6,908,533 B2 | 6/2005 | Zebuhr | |
| 7,368,039 B2 | 5/2008 | Zebuhr | |
| 7,427,336 B2 | 9/2008 | Zebuhr | |
| 7,641,772 B2 | 1/2010 | Zebuhr | |
| 7,955,476 B2 | 6/2011 | Mansur | |
| 8,858,758 B2 | 10/2014 | Zebuhr | |
| 2002/0038760 A1 | 4/2002 | Salmisuo | |
| 2002/0092624 A1 | 7/2002 | Zebuhr | |
| 2002/0092758 A1 | 7/2002 | Zebuhr | |
| 2002/0092762 A1 | 7/2002 | Zebuhr | |
| 2006/0231378 A1 | 10/2006 | Wolfgang et al. | |
| 2008/0237025 A1 | 10/2008 | Zebuhr | |
| 2008/0237026 A1 | 10/2008 | Zebuhr | |
| 2009/0229804 A1 | 9/2009 | Zebuhr | |
| 2009/0242380 A1 | 10/2009 | Zebuhr | |

FOREIGN PATENT DOCUMENTS

| | | |
|---|---|---|
| JP | 56015802 A | 2/1981 |
| JP | 60244301 A | 4/1985 |
| JP | 62-110794 A | 5/1987 |
| JP | H03238001 | 10/1991 |
| JP | H0679101 | 3/1994 |
| JP | H1180085 | 3/1999 |
| JP | 2000300901 | 10/2000 |
| JP | 2004503373 A | 1/2002 |
| JP | 2007507329 A | 4/2005 |
| WO | WO 02/05920 A1 | 1/2002 |
| WO | WO 2005/030358 A1 | 4/2005 |
| WO | WO 2010/045069 A2 | 4/2010 |
| WO | WO 2012/012397 A2 | 1/2012 |

OTHER PUBLICATIONS

Notification of Transmittal of the International Search Report and the Written Opinion of the International Searching Authority for PCT/US2011/044497, Title: Distiller; Date of mailing Jan. 23, 2012.

Notification Concerning Transmittal of International Preliminary Report on Patentability (Chapter 1 of the Patent Cooperation Treaty) for International Patent Application PCT/US2011/044497, Title: Distiller; Date of mailing Jan. 31, 2013.

* cited by examiner

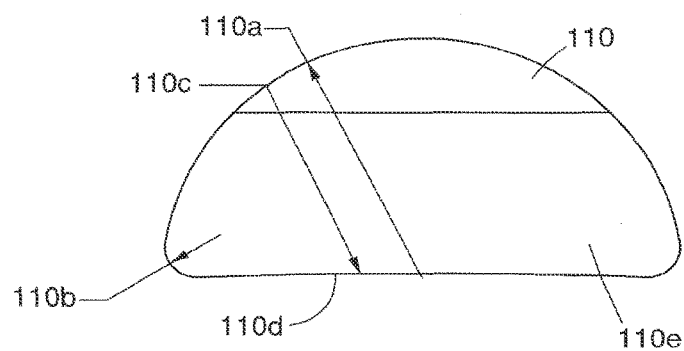
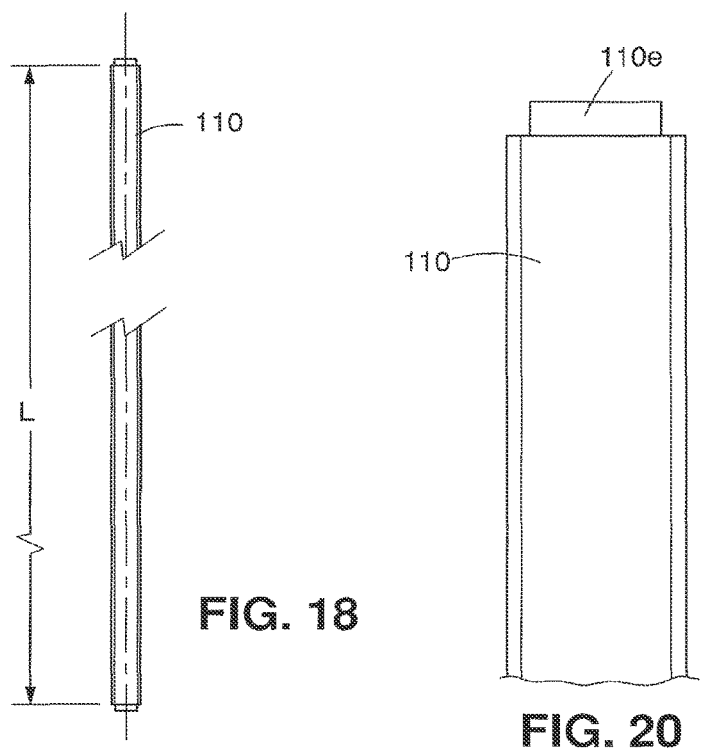

DISTILLER

RELATED APPLICATION

This application is divisional of U.S. application Ser. No. 13/185,894, filed Jul. 19, 2011, which claims the benefit of U.S. Provisional Application No. 61/366,448, filed on Jul. 21, 2010. The entire teachings of the above application are incorporated herein by reference.

BACKGROUND

Prior distillers for purifying liquids, such as water, evaporate the liquid into vapor by heating and then condense the vapor by cooling to obtain distillate. Historically, the energy requirements in prior distillers for evaporating and condensing have been significant, making it uncompetitive with other methods of water purification, for example reverse osmosis.

SUMMARY

The present invention can provide a distiller which can distill a liquid in an energy efficient way, resulting in a distiller that can be more cost effective, and competitive with other purification methods, and therefore, be available for more applications than for prior distilling devices. The distiller includes an evaporator having at least one evaporation surface for evaporating liquid into vapor. At least one movable liquid applicator assembly having a wiper applicator can move over the at least one evaporation surface, for wiping and applying a thin even film of the liquid on the at least one evaporation surface for evaporation.

In particular embodiments, the at least one liquid applicator assembly can include a scraper for scraping residuals from the at least one evaporation surface prior to applying the thin even film of the liquid with the wiper applicator. The scraper and the wiper applicator can include scraper and wiper members, respectively. The scraper and wiper members can be positioned on opposite sides of a liquid supply conduit. The at least one evaporation surface, the scraper and the wiper members, and the liquid supply conduit, can extend in an upright orientation. The at least one evaporation surface can include at least two opposing spaced apart evaporation surfaces facing each other. The at least one movable applicator assembly can have a pair of scraper members and a pair of wiper members, for scraping residuals and applying the liquid to the at least two opposing evaporation surfaces simultaneously. The at least two opposing spaced apart evaporation surfaces can face each other and can be formed by at least two concentric elongate cylinders with the at least one movable liquid applicator assembly movable therebetween in a circular path. The pair of scraper members and the pair of wiper members can position the liquid supply conduit between the at least two opposing spaced apart evaporation surfaces. The liquid supply conduit can extend vertically between and spaced from the at least two opposing evaporation surfaces. The liquid supply conduit can include at least one opening for distributing the liquid between the liquid supply conduit and the at least two opposing evaporation surfaces, whereby the wiper members which follow wipe and apply the liquid into the thin even film of liquid. The liquid supply conduit can include a series of intermittent openings along a length to distribute the liquid for application. The scraper and wiper members can include elongate blades which are positioned within respective elongate recesses of retaining structures extending from opposite sides of the liquid supply conduit. The scraper and wiper blades, and the respective elongate recesses, can be shaped to move the scraper and wiper blades against the at least one evaporation surface along respective contact lines. The scraper and wiper blades, and the elongate recesses, can also have curved surfaces that are shaped and sized to allow rocking movement of the scraper and wiper blades to optimize the contact lines. At least one wiper member can form a line of contact against the at least one evaporation surface. The wiper member can have intermittent openings sized and spaced along the line of contact to allow the liquid to pass through to provide a desired film thickness. The distiller can also include a condenser having at least one condenser surface to condense the vapor into distillate.

The present invention can also provide a distiller including an evaporator having at least two opposing spaced apart evaporation surfaces facing each other for evaporating liquid into vapor. At least one movable liquid applicator assembly can move between the at least two opposing spaced apart evaporation surfaces. The at least one liquid applicator assembly can have a pair of scraper members positioned on opposite sides of a liquid supply conduit forward of the liquid supply conduit, and a pair of wiper members positioned on opposite sides of the liquid supply conduit rearward of the liquid supply conduit. The scraper members can simultaneously scrape residuals from the at least two opposing spaced apart evaporation surfaces, and the wiper members can subsequently wipe and apply liquid provided by the liquid supply conduit in a thin even film simultaneously on the at least two opposing spaced apart evaporation surfaces for evaporation.

The present invention can also provide a distiller including a condenser for receiving vapor having at least one condensing surface for condensing the vapor into distillate. At least one extractor assembly having at least one scraper can move over the at least one condensing surface and scrape distillate from the at least one condensing surface for collection.

In particular embodiments, the condenser can include at least two opposing spaced apart upright condensing surfaces facing each other and sealed to form at least one condenser gap therebetween. The at least one condenser gap can have a sealed bottom end, and an opening at an upper end. A compressor can introduce the vapor under pressure into the upper end and downwardly into the at least one condenser gap. The vapor can condense on the upright condensing surfaces as a distillate. The at least one extractor assembly can be upright and movable within the at least one condenser gap for removing the distillate from the at least one condenser gap. The at least one scraper can scrape distillate from the upright condensing surfaces for collection at the bottom end of the at least one condenser gap. The at least one extractor assembly can also include a distillate extraction channel having an entrance opening at about the bottom end of the at least one condenser gap for entry of the distillate for removal from the condenser. The pressure of the vapor entering the at least one condenser gap is capable of forcing the distillate upwardly through the extraction channel and out of the condenser. The at least two opposing spaced apart upright condensing surfaces can be formed by at least two concentric elongate cylinders forming an annular condenser gap therebetween. The extractor assembly can move within the annular condenser gap in a circular path. The at least one extractor assembly can include a noncondensable gas extraction channel having an entrance opening near the bottom end of the at least one condenser gap for entry of noncondensable gases for removal from the condenser. The pressure of the vapor entering the at least one condenser gap is capable of forcing the noncondensable gases upwardly through the noncondensable gas extraction channel and out of the condenser. A pump can create suction on the distillate extraction channel for aiding the removal of distillate from the condenser. The at least one extractor assembly can have two upright scrapers for simultaneously scraping distillate from opposing spaced apart condensing surfaces. The scrapers can include scraper members. The scraper members can include elongate blades which are positioned within respective elongate recesses of the at least one extractor assembly. The elongate blades and elongate recesses can be shaped to move the scraper blades against the opposing spaced apart condensing surfaces along respective contact lines. The scraper blades and the elongate recesses can have curved surfaces that are shaped and sized to allow rocking movement of the scraper blades to optimize the contact lines. The distiller can also include an evaporator to evaporate liquid into the vapor.

The present invention can also provide a distiller including a condenser for receiving and condensing vapor having at least two opposing spaced apart upright condensing surfaces facing each other and sealed to form at least one condenser gap therebetween. The at least one condenser gap can have a sealed bottom end, and an opening at an upper end. A compressor can introduce the vapor under pressure into the upper end and downwardly into the at least one condenser gap. The vapor can condense on the upright condensing surfaces as a distillate. At least one upright extractor assembly is movable within the at least one condenser gap for removing the distillate from the at least one condenser gap. The at least one extractor assembly can have at least one scraper for scraping distillate from the upright condensing surfaces for collection at the bottom end of the at least one condenser gap. A distillate extraction channel having an entrance opening at about the bottom end of the at least one condenser gap can allow entry of the distillate for removal from the condenser. The pressure of the vapor entering the at least one condenser gap is capable of forcing the distillate upwardly through the distillate extraction channel and out of the condenser.

The present invention can also provide a rotary device in a distiller that includes a stationary shaft having an internal cavity for accepting distillate lubricant. A rotor can be rotatably mounted to the shaft by at least one bearing member. The at least one bearing member is capable of rotating around an exterior surface of the shaft. The shaft can have at least one passage extending from the internal cavity to the exterior surface of the shaft for providing a quantity of distillate lubricant between the exterior surface of the shaft and the at least one bearing, to form a thin film of the distillate lubricant therebetween.

In particular embodiments, the shaft can be hollow and vertically oriented. The distillate lubricant can be introduced into the internal cavity of the hollow shaft at an upper portion of the shaft. The at least one passage can extend from the internal cavity to the exterior surface of the shaft at a lower portion of the shaft. The distillate lubricant provided to the at least one bearing can flow upwardly to a pump driven by the rotary device for recirculation back into the internal cavity of the hollow shaft. The rotary device can be a compressor motor in a vapor compression distiller and the distillate lubricant can be distillate water. The at least one bearing can be a sleeve bearing, and in some embodiments, can include two sleeve bearings. The shaft can be formed of ceramic material, and the at least one bearing can be formed from a material such as ceramic material and composite material.

The present invention can also provide a counterflow heat exchanger for a distiller. The distiller can receive incoming liquid and distill the incoming liquid into distillate liquid and concentrate liquid for discharge. The heat exchanger can have a spiral distillate liquid flow channel for conveying the distillate liquid, which is formed of a first tubing that is configured in a spiral configuration, and a spiral concentrate liquid flow channel for conveying the concentrate liquid, which is formed of a second tubing that is configured in a spiral configuration. The spiral distillate and concentrate liquid flow channels can be housed in a housing. The spiral distillate and concentrate liquid flow channels can be positioned in the housing relative to each other in a configuration to provide a spiral gap therebetween that form a spiral incoming liquid flow channel for conveying the incoming liquid adjacent to the spiral distillate and concentrate liquid flow channels for heat exchange. The incoming liquid flow channel can have a flow direction that is opposite to the distillate and concentrate liquid flow channels.

In particular embodiments, the distillate and concentrate liquid flow channels can be formed of flat tubing. The edges of the flat tubing of the distillate and concentrate liquid flow channels can be abutted together and sealed. Each of the spiral flow channels can spiral around a vertical axis. The incoming liquid can enter the incoming liquid flow channel at a radially outwardly located inlet, and exit the incoming liquid flow channel at a radially inwardly located outlet. In some embodiments, the heat exchanger can be a first heat exchanger, and a second heat exchanger can be fluidly connected to the first heat exchanger in a series.

The present invention can also provide a distiller for receiving incoming liquid and distilling the liquid with an evaporator and condenser to form distillate liquid and concentrate liquid. The distiller can include a sealed housing having a sump at a bottom portion of the housing for collecting the incoming liquid for distillation. At least one rotating component can be positioned within the housing for moving at least one of liquid and gases within the distiller. The at least one rotating component can have non-contact dynamic seals that leak liquid slightly. The distiller can be configured for directing the leaked liquid from the seals to the sump. Some of the liquid in the sump can be directed to the evaporator for distillation, and some of the liquid in the sump can be removed for removing concentrate liquid.

In particular embodiments, the distiller can be a vapor compression distiller. The at least one rotating component can include a compressor that rotates on water lubricated bearings. The at least one rotating component can include a sump circulation pump, a concentrate liquid removal pump and a distillate liquid removal pump. The at least one rotating component can rotate about a vertical axis. The housing can be cylindrical in shape and positioned in a vertical orientation concentrically relative to the vertical axis.

The present invention can also provide a distiller including an evaporator for heating and evaporating incoming liquid. The incoming liquid that has evaporated into distillate liquid can be condensed with a condenser. A dewar having inner and outer walls can contain the evaporator and condenser. The dewar can have an opening. A counterflow heat exchanger can be positioned within the dewar near and across the opening of the dewar. The counterflow heat exchanger can have a incoming liquid inlet located near the inner wall of the dewar into which the incoming liquid enters via a conduit extending through the opening of the dewar. An incoming liquid flow channel can be connected to the incoming liquid inlet and extend inwardly for heating the incoming liquid. A distillate flow channel can be adjacent to the incoming liquid flow channel for flowing distillate liquid in the opposite direction to flow of the incoming liquid in the incoming liquid flow channel for heat exchange and form an increasing temperature gradient relative to the incoming liquid flow channel extending away from the incoming liquid inlet.

In particular embodiments, the dewar can be generally cylindrically shaped with an open end. The counter flow heat exchanger can be a spiral heat exchanger, and the distiller can be a vapor compression distiller. The components in the opening of the dewar can have an increasing temperature gradient moving inwardly into the dewar.

The present invention can also provide a distiller including an evaporator condenser having at least three upright cylindrical members positioned concentrically relative to each other to form at least one annular evaporation channel with opposing walls that form evaporation surfaces, and at least one annular condensing channel with opposing walls that form condensing surfaces. The at least one annular evaporation channel can be open at a bottom end and sealed at an upper end, and the at least one annular condensing channel can be sealed at a bottom end and open at an upper end.

In particular embodiments, a sump can be positioned below the open bottom end of the at least one annular evaporation channel. The sump can contain liquid for application onto the evaporation surfaces for evaporation. A cylindrical housing can house the evaporator condenser. The sump can be located at the bottom of the housing. The housing can include a dewar for insulating the distiller. The cylindrical housing can extend around the evaporator condenser in a manner to form a annular evaporation gap therebetween. A compressor can be positioned within an innermost cylindrical member of the evaporator condenser. The compressor can draw vapor from the evaporation surfaces of the at least one annular evaporation channel and deliver the vapor to the condensing surfaces of the at least one annular condensing channel. The compressor can include a turbine driven by a motor. The compressor is capable of providing the vapor with a pressure, measured in water column height that is greater than a height of the at least one annular condensing channel.

A liquid applicator assembly can rotate within the at least one annular evaporation channel concentrically relative to the cylindrical members of the evaporator condenser. A liquid extractor assembly can rotate within the at least one annular condensing channel concentrically relative to the cylindrical members. Connecting members can axially connect the liquid applicator assembly to the liquid extractor assembly. A transmission can rotatably drive the liquid applicator assembly and the liquid extractor assembly. One assembly can have a drive ring gear that drives at least one drive planet gear having a planet shaft passing through a partition wall to drive at least one driven planet gear and a driven ring gear to drive the other assembly. At least three sets of drive and driven planet gears are evenly spaced apart from each other, centering the ring gears and the assemblies relative to each other by utilizing the sets of planet gears as rollers. The planet gears can be lubricated with distillate from the distiller. The liquid extractor assembly can drive the liquid applicator assembly, and a water motor can drive the liquid extractor assembly.

The present invention can also provide a method of distilling with a distiller including providing an evaporator having at least one evaporation surface for evaporating liquid into vapor. A thin even film of the liquid can be wiped and applied on the at least one evaporation surface for evaporation with at least one movable liquid applicator assembly having a wiper applicator for moving over the at least one evaporation surface.

In particular embodiments, residuals can be scraped from the at least one evaporation surface with a scraper that is included with the at least one liquid applicator assembly, prior to applying the thin even film of the liquid with the wiper applicator. The scraping and wiping with the scraper and the wiper applicator, can be performed using scraper and wiper members, respectively. The scraper and wiper members can be positioned on opposite sides of a liquid supply conduit. The at least one evaporation surface, the scraper and the wiper members, and the liquid supply conduit, can extend in an upright orientation. The at least one evaporation surface can be provided with at least two opposing spaced apart evaporation surfaces facing each other. Residuals can be scraped and the liquid can be applied to the at least two opposing evaporation surfaces simultaneously with the at least one movable liquid applicator assembly having a pair of scraper members and a pair of wiper members. The at least two opposing spaced apart evaporation surfaces facing each other can be formed with at least two concentric elongate cylinders. The at least one movable liquid applicator assembly can be moved therebetween in a circular path. The liquid supply conduit can be positioned between the at least two opposing spaced apart evaporation surfaces with the pair of scraper members and the pair of wiper members. The liquid supply conduit can extend vertically between and spaced from the at least two opposing evaporation surfaces. The liquid can be distributed between the liquid supply conduit and the at least two opposing spaced apart evaporation surfaces with the liquid supply conduit through at least one opening. The liquid can be wiped and applied into the thin even film of liquid with the wiper members which follow. The liquid for application can be distributed with the liquid supply conduit through a series of intermittent openings along a length. The scraper and wiper members can be provided with elongate blades which are positioned within respective elongate recesses of retaining structures extending from opposite sides of the liquid supply conduit. The scraper and wiper blades, and the respective elongate recesses, can be shaped such that the scraper and wiper blades move against the at least one evaporation surface along respective contact lines. The scraper and wiper blades, and the respective elongate recesses, can be configured with curved surfaces that are shaped and sized to allow rocking movement of the scraper and wiper blades to optimize the contact lines. At least one wiper member can form a line of contact against the at least one evaporation surface. The wiper member can be provided with intermittent openings sized and spaced along the line of contact to allow the liquid to pass through to provide a desired film thickness. The vapor in the distiller can be condensed into distillate with a condenser having at least one condenser surface.

The present invention can also provide a method of distilling with a distiller including providing an evaporator having at least two opposing spaced apart evaporation surfaces facing each other for evaporating liquid in the vapor. At least one movable liquid applicator assembly can be moved between the at least two opposing spaced apart evaporation surfaces. The at least one liquid applicator assembly can have a pair of scraper members positioned on opposite sides of a liquid supply conduit forward of the liquid supply conduit, and a pair of wiper members positioned on opposites sides of the liquid supply conduit rearward of the liquid supply conduit. The scraper members can simultaneously scrape residuals from the at least two opposing spaced apart evaporation surfaces and the wiper members can subsequently wipe and apply liquid provided by the liquid supply conduit in a thin even film simultaneously on the at least two opposing spaced apart evaporation surfaces for evaporation.

The present invention can also provide a method of distilling with a distiller including receiving vapor on at least one condensing surface of a condenser for condensing the vapor into distillate. At least one extractor assembly having at least one scraper can move over the at least one condensing surface and scrape distillate from the at least one condensing surface for collection.

In particular embodiments, at least two opposing spaced apart upright condensing surfaces facing each other can be provided which are sealed to form at least one condenser gap therebetween. The at least one condenser gap can have a sealed bottom end, and an opening at an upper end. Vapor can be introduced under pressure with a compressor into the upper end and downwardly into the at least one condenser gap. The vapor can condense on the upright condensing surfaces as a distillate. The at least one extractor assembly which is upright, can be moved within the at least one condenser gap for removing the distillate from the at least one condenser gap. The at least one scraper can scrape distillate from the upright condensing surfaces for collection at the bottom end of the at least one condenser gap. The at least one extractor assembly can also include a distillate extraction channel having an entrance opening at about the bottom end of the at least one condenser gap for entry of the distillate for removal from the condenser. The pressure of the vapor entering the at least one condenser gap can force the distillate upwardly through the extraction channel and out of the condenser. The at least two opposing spaced apart upright condensing surfaces can be formed with at least two concentric elongate cylinders which form an annular condenser gap therebetween. The extractor assembly can be moved within the annular condenser gap in a circular path. The at least one extractor assembly can be provided with a noncondensable gas extraction channel having an entrance opening near the bottom end of the at least one condenser gap for entry of noncondensable gases for removal from the condenser. The noncondensable gases can be forced upwardly through the noncondensable extraction channel and out of the condenser with the pressure of the vapor entering the at least one condenser gap. A suction can be created on the distillate extraction channel with a pump for aiding the removal of the distillate from the condenser. Distillate can be simultaneously scraped from opposing spaced apart condensing surfaces with two upright scrapers of the at least one extractor assembly. The scrapers can be formed with scraper members. The scraper members can be formed with elongate blades which are positioned within respective elongate recesses of the at least one extractor assembly. The elongate blades and the elongate recesses can be shaped to move the scraper blades against the two opposing spaced apart condensing surfaces along respective contact lines. The scraper blades and the elongate recesses, can be configured with curved surfaces that are shaped and sized to allow rocking movement of the scraper blades to optimize the contact lines. In the distiller, liquid can be evaporated into the vapor with an evaporator.

The present invention can also provide a method of distilling with a distiller including receiving and condensing vapor with at least two opposing spaced apart upright condensing surfaces of a condenser that are facing each other and sealed to form at least one condenser gap therebetween. The at least one condenser gap can have a sealed bottom end, and opening at an upper end. The vapor can be introduced under pressure with a compressor into the upper end and downwardly into the at least one condenser gap. The vapor can condense on the upright condensing surfaces as a distillate. At least one upright extractor assembly can be moved within the at least one condenser gap for removing the distillate from the at least one condenser gap. The at least one extractor assembly can have at least one scraper for scraping distillate from the upright condensing surfaces for collection at the bottom end of the at least one condensing gap, and a distillate extraction channel having an entrance opening at about the bottom end of the at least one condenser gap for entry of the distillate for removal from the condenser. The pressure of the vapor entering the at least one condenser gap can force the distillate upwardly through the distillate extraction channel and out of the condenser.

The present invention can also provide a method of lubricating a rotary device in a distiller including providing a stationary shaft with an internal cavity for accepting distillate lubricant. A rotor can be rotatably mounted to the shaft with at least one bearing member. The at least one bearing member is capable of rotating around an exterior surface of the shaft. The shaft can be provided with at least one passage extending from the internal cavity to the exterior surface of the shaft for providing a quantity of lubricant between the exterior surface of the shaft and the at least one bearing, to form a thin film of the distillate lubricant therebetween.

In particular embodiments, the shaft can be configured to be hollow and vertically oriented. The distillate lubricant can be introduced into the internal cavity of the hollow shaft at an upper portion of the shaft. The at least one passage can extend from the internal cavity to the exterior surface of the shaft at a lower portion of the shaft. The distillate lubricant provided to the at least one bearing can flow upwardly to a pump driven by the rotary device for recirculation back into the internal cavity of the hollow shaft. The rotary device can be formed as a compressor motor in a vapor compression distiller, and distillate water can be employed as the distillate lubricant. The at least one bearing can be configured as a sleeve bearing, and in some embodiments, can be two sleeve bearings. The shaft can be formed from ceramic, and the at least one bearing can be formed from a material, such as ceramic material and composite material.

The present invention can also provide a method of exchanging heat between liquids entering and exiting a distiller with a counterflow heat exchanger in the distiller. The distiller can receive incoming liquid and distill the incoming liquid into distillate liquid and concentrate liquid for discharge. The distillate liquid can be conveyed through a spiral distillate liquid flow channel that is formed of a first tubing that is configured in a spiral configuration. The concentrate liquid can be conveyed through a spiral concentrate liquid flow channel that is formed of a second tubing that is configured in a spiral configuration. The spiral distillate and concentrate liquid flow channels can be housed within a housing. The spiral distillate and concentrate liquid flow channels can be positioned in the housing relative to each other in a configuration to provide a spiral gap therebetween that forms a spiral incoming liquid flow channel for conveying the incoming liquid adjacent to the spiral distillate and concentrate liquid flow channels for heat exchange between the incoming liquid and the distillate and concentrate liquids. The incoming liquid within the incoming liquid flow channel can have a flow direction that is opposite to the distillate liquid and concentrate liquid flowing within the distillate liquid and concentrate liquid flow channels.

In particular embodiments, the distillate and concentrate liquid flow channels can be formed from flat tubing. The edges of the flat tubing of the distillate and concentrate liquid flow channels can be abutted together and sealed. Each of the spiral flow channels can spiral around a vertical axis. The incoming liquid can enter the incoming liquid flow channel at a radially outwardly located inlet, and exit the incoming liquid flow channel at a radially inwardly located outlet. In some embodiments, the heat exchanger can be a first heat exchanger, and a second heat exchanger can be fluidly connected to the first heat exchanger in a series.

The present invention can also provide a method of distilling with a distiller that receives incoming liquid and distills the liquid with an evaporator and condenser to form distillate liquid and concentrate liquid. The incoming liquid can be collected for distillation in a sealed housing having a sump at a bottom portion of the housing. At least one of liquids and gases can be moved within the distiller with at least one rotating component positioned within the housing. The at least one rotating component can have non-contact dynamic seals that leak liquid slightly. The distiller can be configured for directing the leaked liquid from the seals to the sump. Some of the liquid in the sump can be directed to the evaporator for distillation, and some of the liquid in the sump can be removed for removing concentrate liquid.

In particular embodiments, the distiller can be configured as a vapor compression distiller. The at least one rotating component can be provided with a compressor that rotates on water lubricated bearings. The at least one rotating component can be provided with a sump circulation pump, a concentrate liquid removal pump, and a distillate liquid removal pump. The at least one rotating component can be rotated about a vertical axis. The housing can be configured to be cylindrical in shape and positioned in a vertical orientation concentrically relative to the vertical axis.

The present invention can also provide a method of distilling with a distiller including heating and evaporating incoming liquid with an evaporator. The incoming liquid that has been evaporated can be condensed into distillate liquid with a condenser. The evaporator and the condenser can be contained within a dewar having inner and outer walls. The dewar can have an opening. A counterflow heat exchanger can be positioned within the dewar near and across the opening of the dewar. The counterflow heat exchanger can have an incoming liquid inlet located near the inner wall of the dewar into which the incoming liquid enters via a conduit extending through the opening of the dewar. An incoming liquid flow channel can be connected to the incoming liquid inlet and extend inwardly for heating the incoming liquid. A distillate flow channel can be adjacent to the incoming liquid flow channel for flowing distillate liquid in the opposite direction to the flow of the incoming liquid in the incoming liquid flow channel for heat exchange and form an increasing temperature gradient relative to the incoming liquid flow channel extending away from the incoming liquid inlet.

In particular embodiments, the dewar can be configured to be generally cylindrically shaped with an open end. The counterflow heat exchanger can be configured to be a spiral heat exchanger. The distiller can be configured to be a vapor compression distiller. Components in the opening of the dewar can be configured to have an increasing temperature gradient moving inwardly into the dewar.

The present invention can also provide a method of distilling with a distiller including providing an evaporator condenser having at least three upright cylindrical members positioned concentrically relative to each other to form at least one annular evaporation channel with opposing walls that form evaporation surfaces, and at least one annular condensing channel with opposing walls that form condensing surfaces. The at least one annular evaporation channel can be open at a bottom end and sealed at an upper end, and the at least one annular condensing channel can be sealed at a bottom end and open at an upper end. Liquid on the evaporation surfaces can be evaporated into vapor, and the vapor can be condensed into distillate on the condensing surfaces.

In particular embodiments, a sump can be positioned below the open bottom end of the at least one annular evaporation channel for containing the liquid. The liquid can be applied onto the evaporation surfaces for evaporation. The evaporator condenser can be housed within a cylindrical housing. The sump can be located at the bottom of the housing. The housing can be provided with a dewar for insulating the distiller. The cylindrical housing can extend around the evaporator condenser in a manner to form an annular evaporation gap therebetween. A compressor can be positioned within the innermost cylindrical member of the evaporator condenser. Vapor can be drawn with the compressor from the evaporation surfaces of the at least one annular evaporation channel and deliver the vapor to the condensing surfaces of the at least one annular condensing channel. The compressor can be configured to include a turbine driven by a motor. The vapor can be provided with a pressure by the compressor, measured in water column height that is greater than a height of the at least one annular condensing channel.

A liquid applicator assembly can rotate within the at least one annular evaporation channel concentrically relative to the cylindrical members of the evaporator condenser. A liquid extractor assembly can rotate within the at least one annular condensing channel concentrically relative to the cylindrical members. The liquid applicator assembly can be axially connected to the liquid extractor assembly with connecting members. The liquid applicator assembly and the liquid extractor assembly can be rotatably driven with a transmission. One assembly can be configured with a drive ring gear which drives at least one drive planet gear have a planet shaft passing through a partition wall to drive at least one driven planet gear and a driven ring gear to drive the other assembly. At least three sets of drive and driven planet gears can be evenly spaced apart from each other. The ring gears and the assemblies relative to each other can be centered by utilizing the sets of planet gears as rollers. The planet gears can be lubricated with distillate from the distiller. The liquid applicator assembly can be driven with the liquid extractor assembly, and the liquid extractor assembly can be driven with a water motor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 is a schematic drawing of an embodiment of two heat exchangers connected together in series.

FIG. 18 is a side view of an embodiment of a scraper blade for a distillate extraction assembly.

FIG. 19 is an end view of the scraper blade of FIG. 18.

FIG. 20 is an enlarged view of a portion of FIG. 18.

DETAILED DESCRIPTION

A description of example embodiments of the invention follows.

Figure 1:
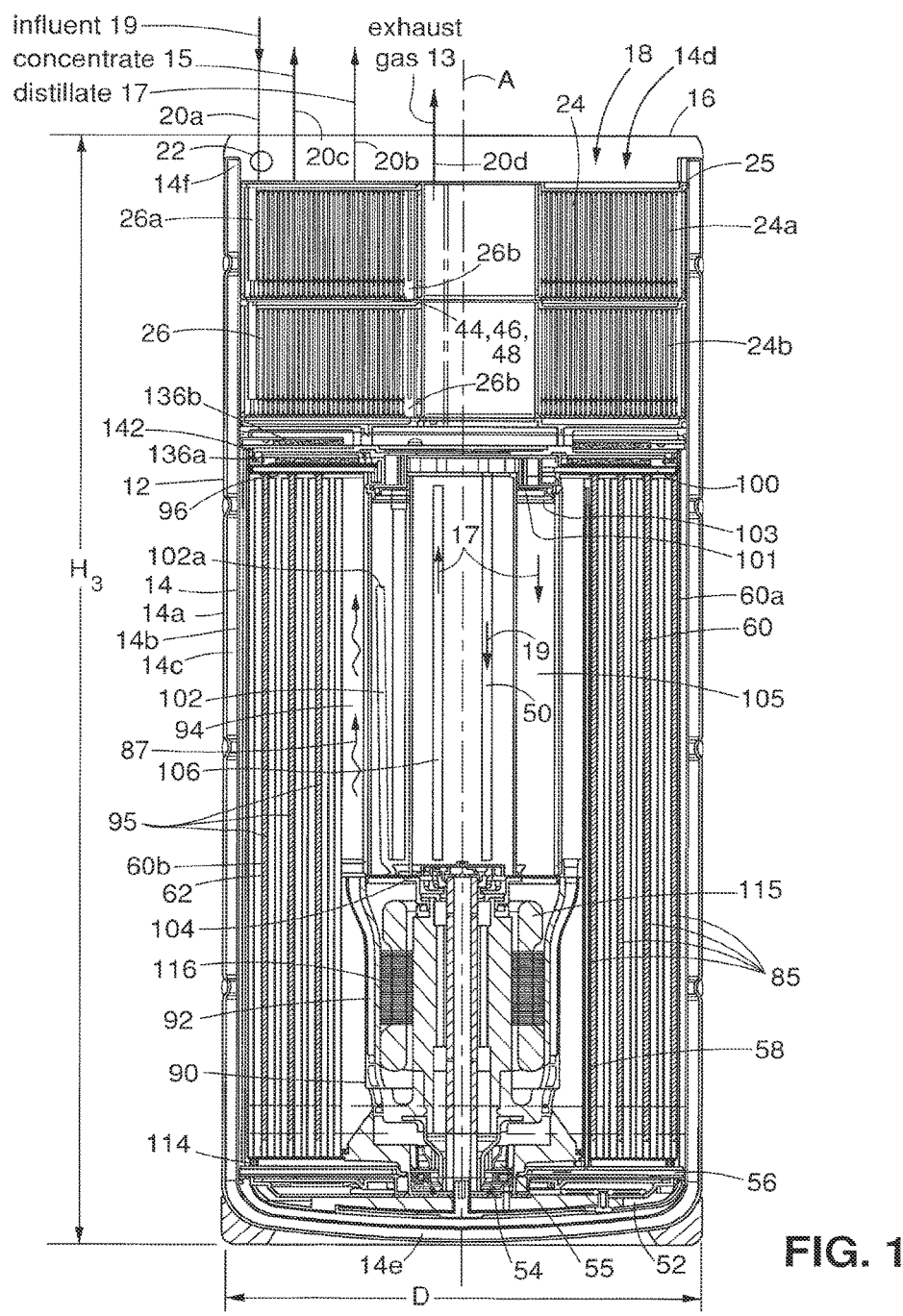
FIG. 1 is a sectional view of an embodiment of a distiller in the present invention.
Figure 2:
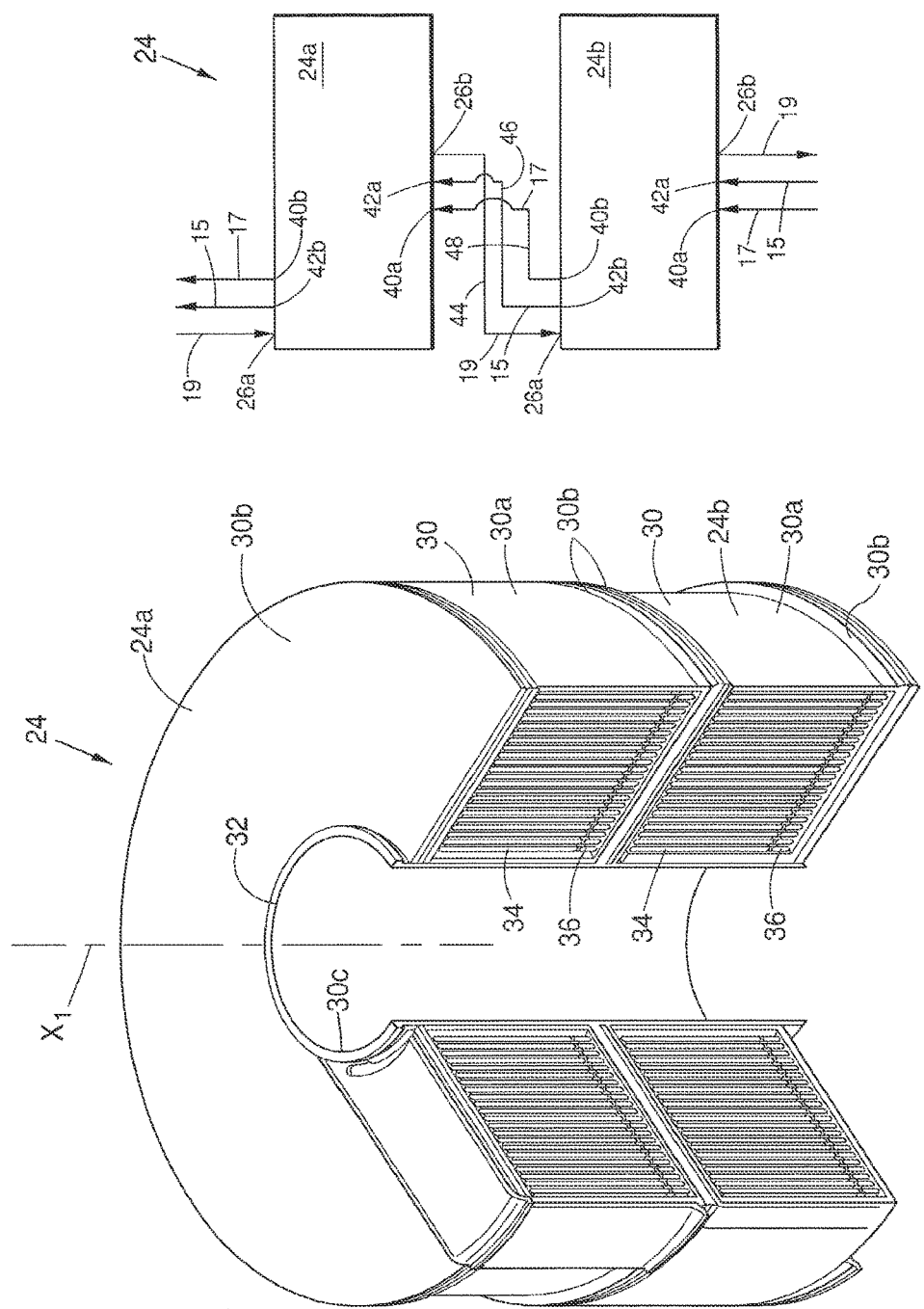
FIG. 2 is a perspective sectional view of an embodiment of a heat exchanger device in the present invention.
Figure 3:
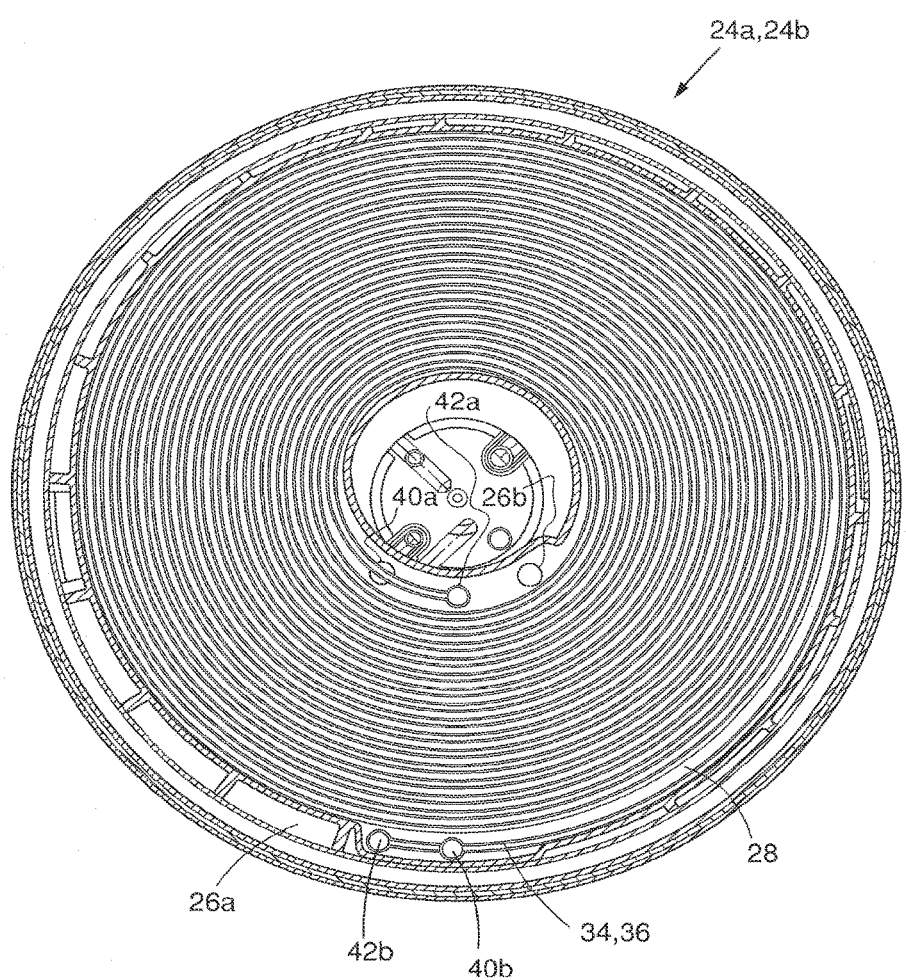
FIG. 3 is a cross sectional view of an embodiment of a heat exchanger.
Figure 5:
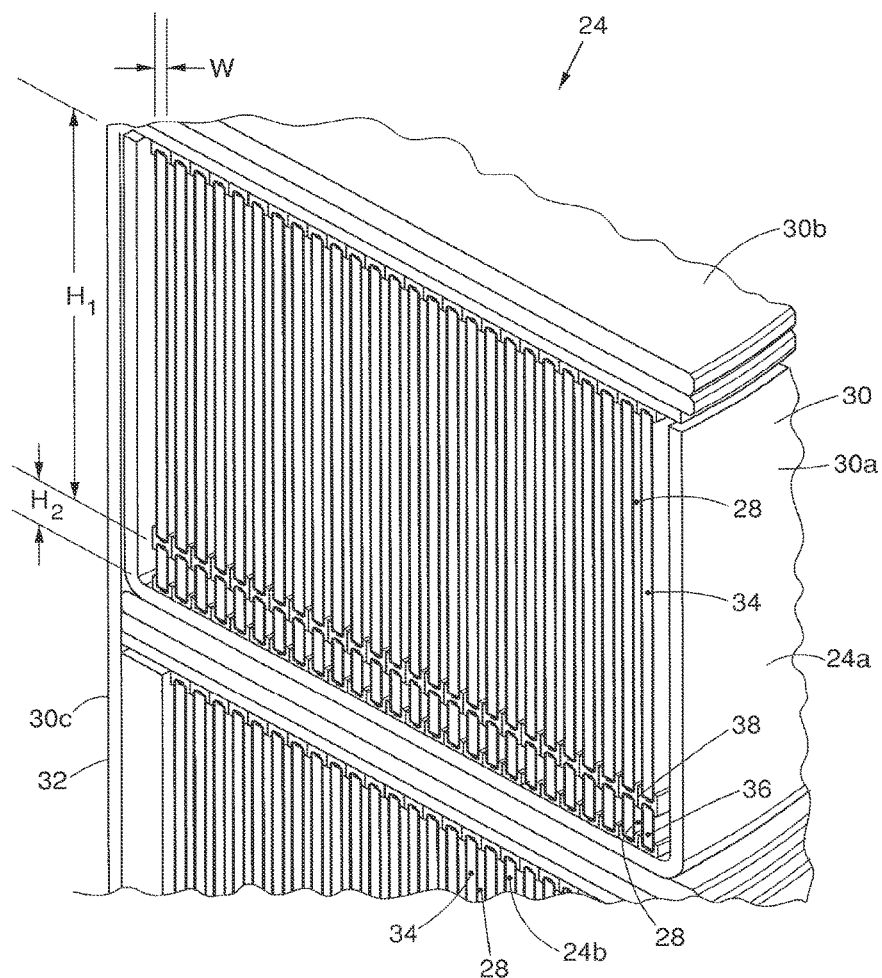
FIG. 5 is an enlarged view of a portion of FIG. 2.

Referring to FIG. 1, in one embodiment, distiller or distilling apparatus or device 10, can be a vapor compression distiller and can distill liquids or fluids such as water, alcohol, etc., to produce a desired purified liquid. The water, can be recycled water, contaminated water, which can be lake, pond, river, stream or ground water, or waste water from a residential house or industrial building. Most often, the water is fresh, but in some embodiments, can be brackish or salt water. The following description will describe distiller 10 in conjunction with distilling water as the influent or incoming liquid, but it will be understood that distiller 10 can distill other suitable liquids.

Distiller 10 can have a sealed housing 12 formed in part from an insulating dewar 14, which surrounds and contains the inner components of the distiller 10, within the interior 18 of the housing 12. The dewar 14 can be generally cylindrical and have outer 14a and inner 14b walls, that are separated by a gap 14c such as a vacuum, to provide a high or efficient insulating housing 12 for containing heat within the distiller 10. A heat exchange or exchanger device 24, such as a counterflow heat exchanger device (FIGS. 2-5), can be positioned within the interior 18 of the dewar 14 across the opening 14d of the dewar 14 for receiving influent or incoming liquid 19, and preheating the incoming liquid 19. A top cap 16 can cover or extend over the heat exchanger device 24 and the opening 14d of the dewar 14. The pre-heated incoming liquid 19 can flow to a sump 52 at the bottom 14e of the dewar 14 and housing 12. A evaporator condenser 60 can be positioned within the interior 18 of the dewar 14 below the heat exchanger device 24 and above the sump 52. The evaporator condenser 60 (FIGS. 6-9) can have both an evaporator 60a for evaporating liquid 19 supplied from the sump 52 into vapor or steam 87, and a condenser 60b for condensing the vapor 87 into condensate or distillate liquid 17 or water. The evaporator condenser 60 can have a series or plurality of concentric elongate cylindrical members or cylinders 64 positioned close to each other and around a vertical central longitudinal axis A which form alternating generally narrow annular evaporator or evaporation channels 66 with opposed evaporator or evaporation surfaces 66a facing each other, and annular condenser or condensing channels 72 with opposed condenser or condensing surfaces 72a facing each other. The evaporation surfaces 66a can be on opposite sides of cylinders 64 from the condensing surfaces 72a. A motorized rotary assembly 115 having a pump 54 for applying the heated liquid 19 from the sump 52 to the evaporator 60a, and a compressor 90 for delivering the vapor 87 to the condenser 60b, can be positioned within the dewar 14 near the bottom 14e, and adjacent to or within the evaporator condenser 60.

Figure 6:
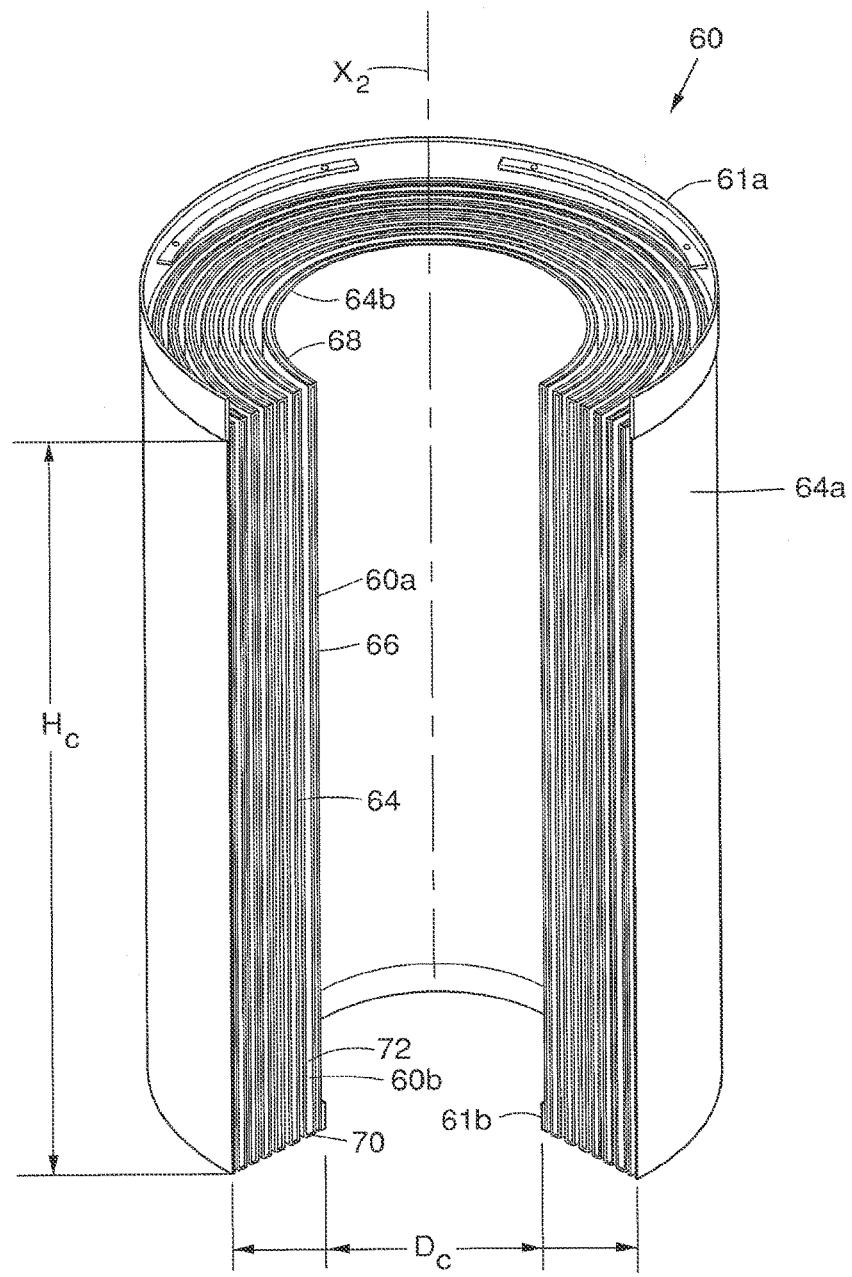
FIG. 6 is a perspective sectional view of an embodiment of an evaporator condenser in the present invention.
Figure 7:
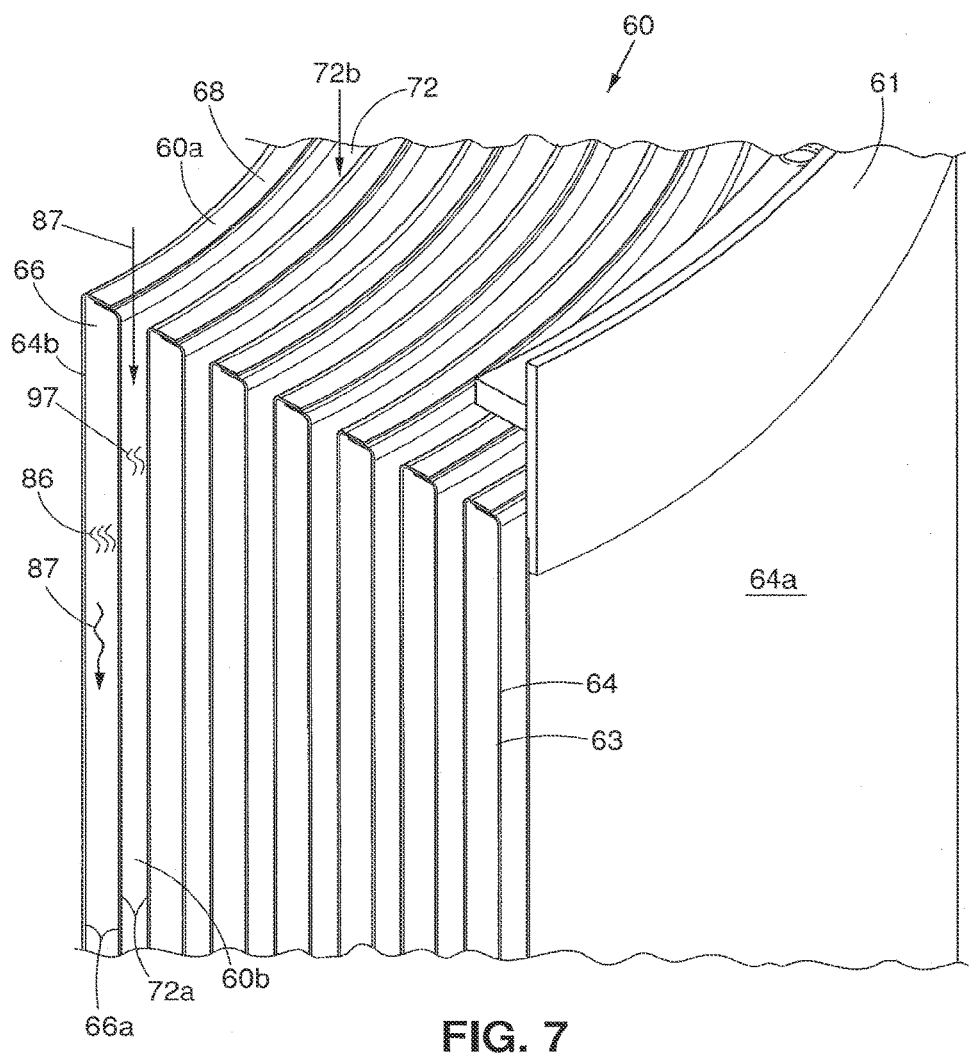
FIG. 7 is an enlarged view of a portion of FIG. 6.
Figure 8:
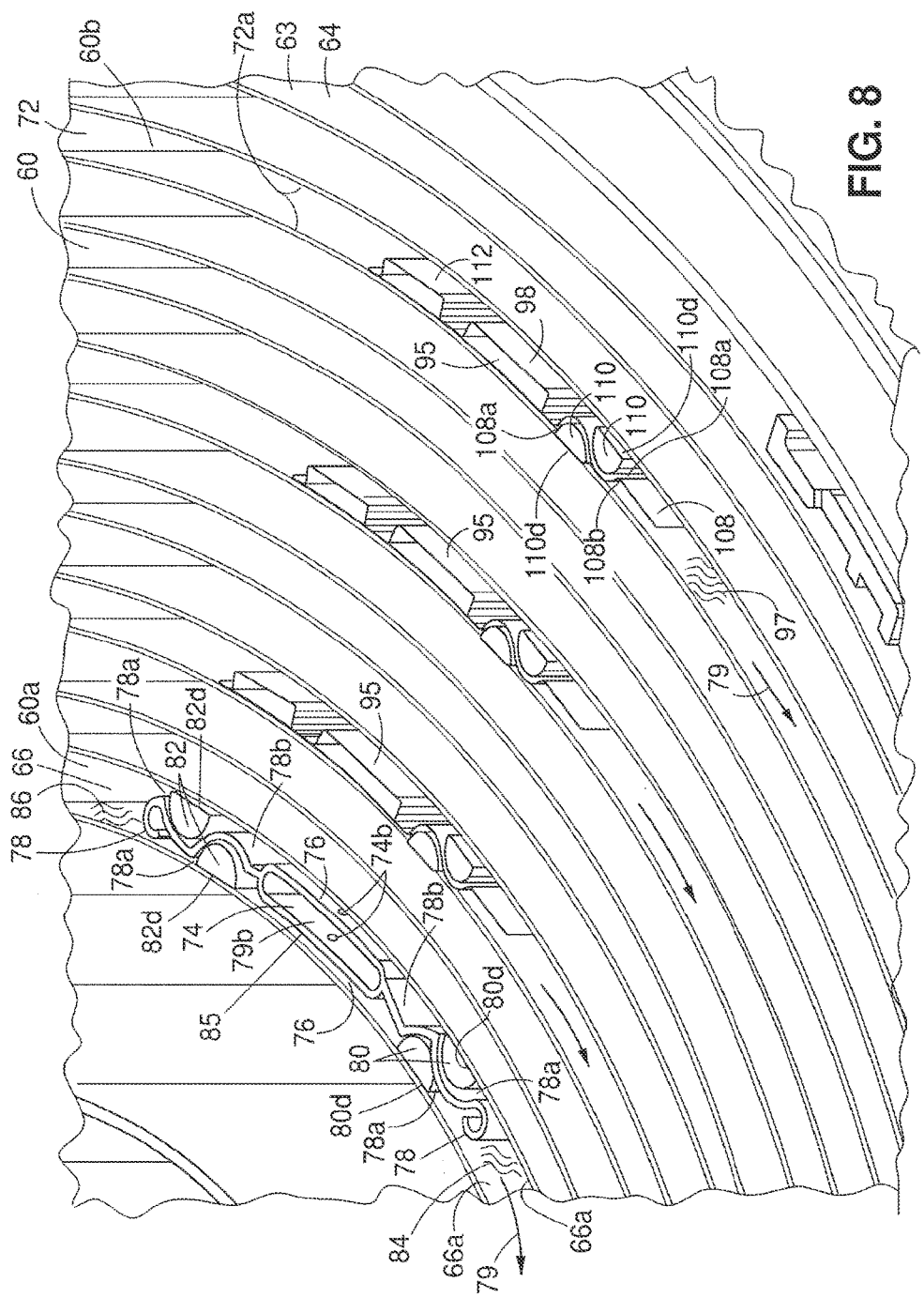
FIG. 8 is a perspective cross sectional view through an embodiment of an evaporator condenser in a distiller depicting embodiments of a liquid applicator assembly and distillate extraction assembly.
Figure 9:
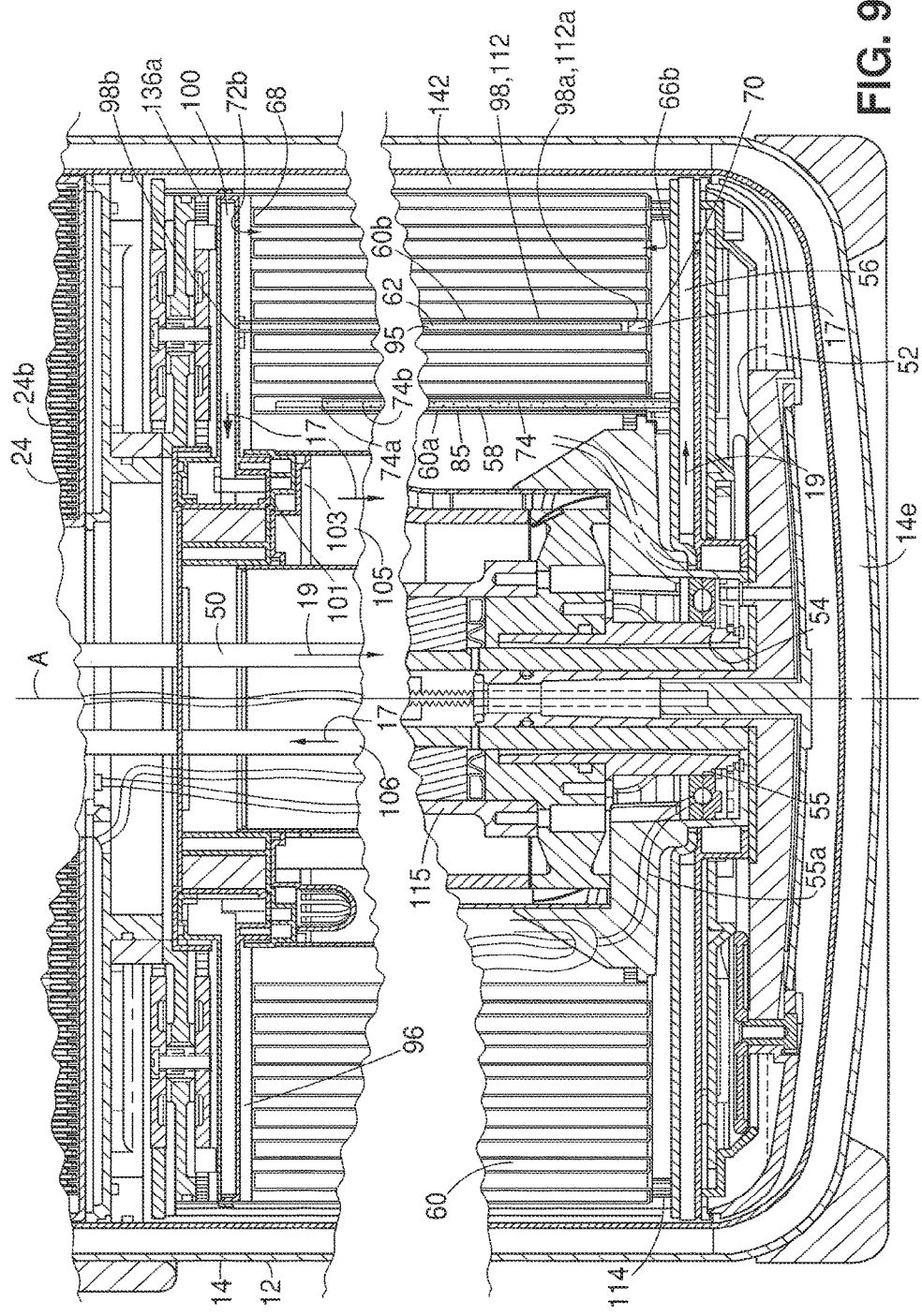
FIG. 9 is a partial sectional view of a lower portion of the distiller.

Referring to FIGS. 1-9, in a general broad description of an example of use, influent or incoming liquid 19 such as water, can enter the distiller 10 through an influent or incoming liquid inlet 20a and an inlet valve 22, to enter the heat exchanger device 24. The heat exchanger device 24 pre-heats the incoming liquid 19 that enters the distiller 10 using exiting heated liquid or liquids that has been processed and heated by the distiller 10. The heated liquid 19 flows to the sump 52. A pump 54 in the rotary assembly 115 pumps the heated liquid 19 in the sump 52 to at least one liquid application or applicator assembly 85 of a moving or movable liquid application or applicator device 58, which applies the heated liquid 19 in a thin film 86 onto the evaporation surfaces 66a of the evaporation condenser 60 with wipers 82, where the thin film 86 evaporates into a vapor 87 such as water vapor or steam. A compressor 90 in the rotary assembly 115 can draw the vapor 87 downwardly from the evaporation surfaces 66a of the evaporator condenser 60 and direct the vapor 87 under pressure up above the evaporator condenser 60, and then down into the condenser 60b of the evaporator condenser 60 over or onto the condensing surfaces 72a. The pressurized vapor 87 condenses on the condensing surfaces 72a into a thin film 97 of condensate or distillate 17, such as purified water. The distillate 17 is then removed or extracted with at least one distillate extraction or extractor assembly 95 of a moving or movable distillate extraction or extractor device 62, having scrapers or wipers 110 which scrape the thin film 97 of distillate 17 off the condensing surfaces 77a, which then flows to the bottom of the condensing channels 72 in the condenser 60b (FIGS. 8 and 9). The distillate 17 is removed upwardly through a distillate extraction or extractor passage, tube, channel or conduit 98, entering through inlet 98a and forced upwardly out of the evaporator condenser 60 by the pressure of the vapor 87, into a rotating manifold 100. The distillate 17 flows to a distillate pump 104 in the rotary assembly 115 which directs the distillate 17 through the heat exchanger device 24 and out of the distiller 10 through the distillate outlet 20b. Concentrated liquid 15 or concentrate in the sump 52 can be removed or pumped out by pump 55 in the rotary assembly 115 through heat exchanger device 24 and concentrate outlet 20c. Noncondensable gases can be exhausted as exhaust gas 13 through exhaust gas outlet 20d.

Referring to FIGS. 1-5, the heat exchanger device 24 can include two counterflow heat exchangers 24a and 24b, which are fluidly connected together in series, and mounted on top of each other. Each counterflow heat exchanger 24 and 24b can have a generally annular cylindrical disc shape with an inward spiral or spiraling influent or incoming liquid flow channel 28, formed between an outward spiral or spirally outgoing distillate liquid flow channel 34, and an outward spiral or spirally outgoing concentrate liquid flow channel 36, which can be positioned around a central axis $X_1$. The axis $X_1$ can be aligned with the longitudinal vertical axis A of the distiller 10, housing 12 and dewar 14. The incoming liquid flow channel 28 can have an inlet 26a that is at a radially outer or outside location away from the axis $X_1$, and an outlet 26b that is at a radially inner or inside location closer to axis $X_1$. The outgoing distillate liquid flow channel 34 and concentrate liquid flow channel 36 can each have a respective inlet 42a and 40a at a radially inner or inside location near the axis $X_1$, and an outlet 42b and 40b at a radially outer or outside location away from axis $X_1$.

The distillate liquid flow channel 34 and the concentrate liquid flow channel 36 can each be made of flat tubing which can have a rectangular cross section, and configured in a spiral configuration. The cross section of the flat tubing of the distillate liquid flow channel 34 can have a small width W, and a base height $H_1$ that is many times the width W, which can be over 20 times the width W. The ratio $H_1$ to W of the tubing for flow channel 34 can be over 20 to 1, for example around 30 to 1. The cross section of the flat tubing of the concentrate liquid flow channel 36 can have the same width W as the tubing for channel 34, but have a height $H_2$ that can be much less than height $H_1$, and can be about 9 times less ($H_1$ to $H_2$, 9 to 1). The ratio $H_2$ to W of the tubing for flow channel 36 can be about 3-4 to 1. The flat surfaces of the bottom width W of the tubing for channel 34 can be abutted to and sealed with a seal 38, or welded, brazed or soldered, to the flat surfaces of the top width W of the tubing for channel 36, thereby forming the channel 28 within the spiral gap therebetween.

A sealed housing 30 can house the spiral tubing for channels 34 and 36 to further form a sealed channel 28, and can be annular in shape. The housing 30 can have an outer cylindrical wall 30a, flat annular end covers 30b, and an inner cylindrical wall 30c, which are all sealed together. The inner wall 30c can form a central cavity 32. The incoming liquid 19 flowing through the inwardly spiraling incoming liquid flow channel 28, flows adjacent to and in the opposite direction to the distillate 17 flowing in the outwardly spiraling distillate liquid flow channel 34 and the concentrate 15 flowing in the outwardly spiraling concentrate liquid flow channel 36, for heat exchange therebetween, where the incoming liquid 19 can pick up heat removed from the distillate 17 and concentrate 15. This forms a temperature gradient which increases in temperature moving radially inward from the radial outer edges of the counterflow heat exchangers 24a and 24b, to the radially inward locations of the counterflow heat exchangers 24a and 24b. Dissolved gases in the incoming liquid 19 can become less soluble as the incoming liquid 19 heats up and can be vented through a vent 25 that can be connected by a conduit to exhaust gas outlet 20d.

The housing 30 can be formed of metal, but can be formed of plastic for light weight and cost reasons. When housing 30 is plastic, the housing 30 can be sized to fit inside housing 12 in such a manner that the housing 12, such as inner wall 14b, can provide the strength and structure of the housing 30 to withstand fluid pressures in the radial direction during use. The tubing for the channels 34 and 36 can each be formed of two flat strips of metal and two wires, which can be bent around a form and welded together in the curved form, rather than to later bend the tubing into a spiral. This can reduce the tendency to kink on the inside diameter wall, and stretch on the outer diameter wall of the spiral.

When connecting two counterflow heat exchangers 24 and 24b in series, the outlet 26b and inlets 42a and 40a of the upper counterflow heat exchanger 24a can be connected to inlet 26a and outlets 42b and 40b of the lower counterflow heat exchanger 24b, via respective connecting channels or conduits 44, 46 and 48.

As previously mentioned, each counterflow heat exchanger 24a and 24b has an increasing temperature gradient, where the incoming liquid 19 enters inlet 26a and travels in spiral channel 28 radially inwardly away from inlet 26a towards outlet 26b, while at the same time increasing in temperature, due to heat exchange with distillate 17 and concentrate 15 flowing in adjacent spiral channels 34 and 36 in the opposite direction. The outwardly flowing distillate 17 and concentrate 15 lose heat and become cooler while flowing spirally outward. Consequently, in each counterflow heat exchange 24a and 24b, the temperature is lowest near the inlet 26a and the inner wall 14b of the dewar 14, and highest near the outlet 26b near the central axis A. In addition, there is an increasing temperature gradient moving from the upper counterflow heat exchanger 24a to the lower counterflow heat exchanger 24b. Consequently, positioning the heat exchanger device 24 in or across the opening 14d of the dewar 14, which has an increasing temperature gradient in both the inward radial direction from the inner wall 14b of the dewar 14, and in the axial direction along axis A entering the opening 14d, heat loss within the interior 18 of the dewar 14 can be minimized where cooler areas of the heat exchanger device 24 are adjacent to the dewar wall 14b and the outer axial location of the opening 14d, so that the distiller 10 can efficiently maintain or retain heat within the distiller 10 for evaporation. In addition, by being highly insulative, the dewar 14 can also retain heat within the interior 18 without significant or much loss.

Typically, most heat loss from the distiller 10 would be radiated through or from components extending across the opening 14d of the dewar 14, and the rim 14f of the opening 14d of the dewar 14, if the outermost components and the rim 14e were hot. The temperature gradient of the heat exchanger device 24 can keep the upper rim 14f adjacent to inlet 26a where incoming liquid 19 enters, close to the ambient exterior temperature, while the inner wall 14b below the heat exchanger device 24 can be close to or about the boiling temperature or 212° F. during operation. Also, the upper counterflow heat exchanger 24a is at a lower temperature than the lower counterflow heat exchanger 24b, and is closer to ambient temperature, at the outer axial location of the opening 14d. Forming the housing 12 and dewar 14 in an elongate cylindrical shape promotes the formation of such a temperature gradient at the opening 14d. The temperature gradient can help conserve heat energy, thereby minimizing the amount of heat required to be input to run the distiller 10. In one example, the housing 12 can have an axial longitudinal height $H_3$ of about 24 inches and a diameter D of about 10 inches, forming a $H_3$ to D ratio of about 2.4 to 1, but can often be 2-3 to 1.

Although heat exchanger device 24 has been described to have two counterflow heat exchangers 24a and 24b connected together in series, in some embodiments, only one or more than two heat exchangers can be employed, and other types of heat exchangers can be used. Typically, the concentrate liquid flow channel 36 has a smaller cross section than the distillate liquid flow channel 34, the size ratios can be varied as desired. In some embodiments, the tubing used does not have to be flat and can have curved surfaces.

The heated incoming liquid 19 can exit the heat exchanger device 24 through a conduit 50 (FIG. 1) that can be connected to outlet 26b, and flows down to the sump 52. Sump 52 is insulated by being in the dewar 14, such as at the bottom 14e, so that the heated liquid 19 can remain in a heated state. By being passively preheated prior to application to the evaporator condenser 60, no extra energy is used for preheating, and also less heat and energy will be required to be applied later to the liquid 19 when on the evaporation surfaces 66a for evaporation, thereby conserving energy and reducing the cost of operation of the distiller 10.

Figure 10:
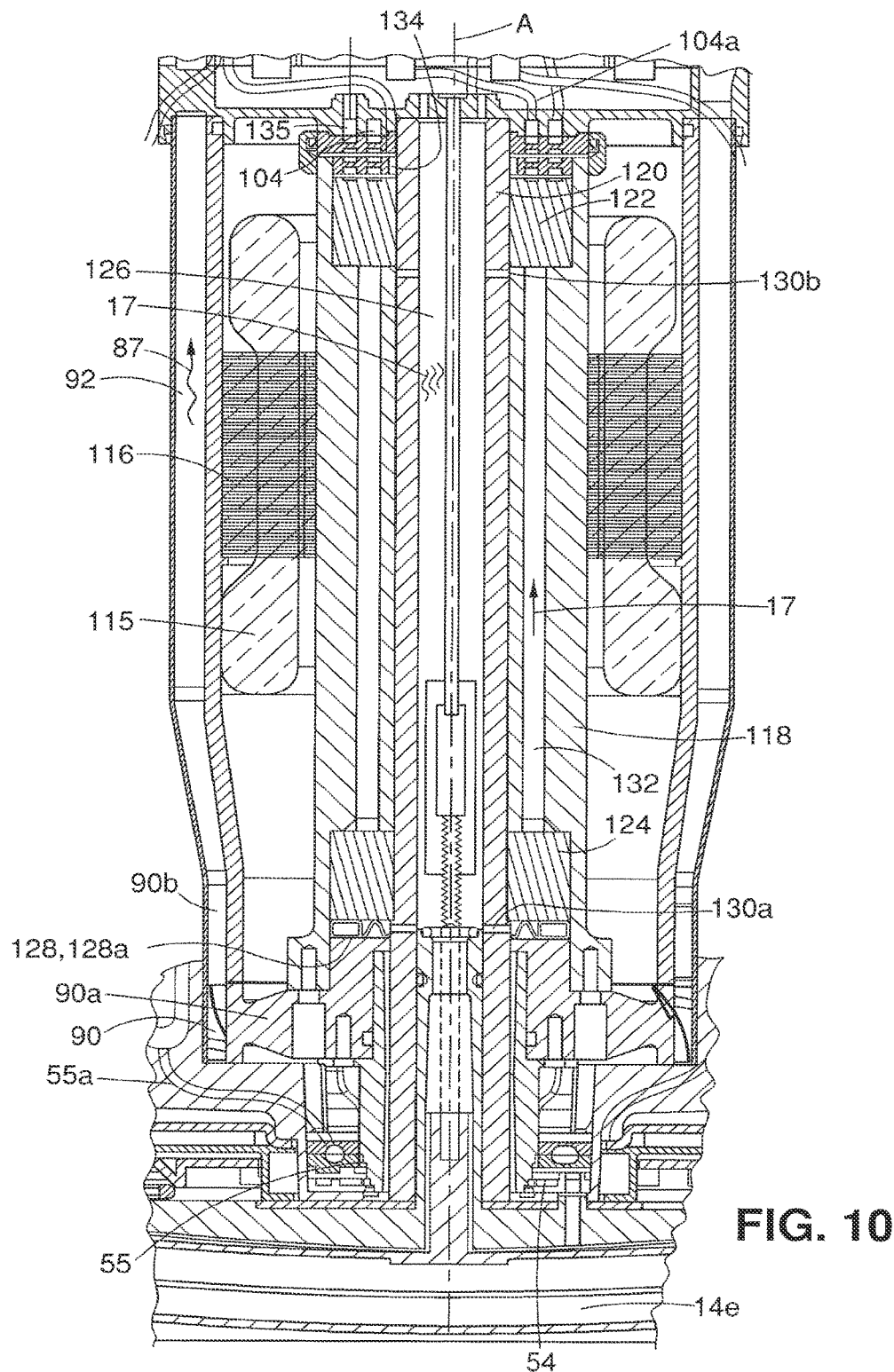
FIG. 10 is a sectional view of an embodiment of a rotary assembly.

The rotary assembly 115 can be positioned at the bottom 14e of the dewar 14 and the housing 12. Rotary assembly 115 (FIG. 10) can include a central shaft 120 which can be stationary and upright or vertically oriented along axis A. A motor 116, which can be an electric motor, or other suitable motor, can be rotatably mounted to shaft 120 for driving and rotating a rotatable rotor 118 about shaft 120 and axis A, on upper and lower bearings 122 and 124. Rotation of rotor 118 rotatably drives pump 54, which can be located at the bottom of the rotor 118 and act as a sump circulation pump, for pumping the heated incoming fluid 19 in the sump 52 to a rotating or rotatable manifold 56 that is positioned below the evaporator condenser 60. The rotating manifold 56 can be part of the moving liquid applicator device 58 which applies the heated liquid 19 to the evaporation surfaces 66a.

The rotor 118 can also include the compressor 90, which can include a turbine for drawing vapor 87 down from the evaporation surfaces 66a of the evaporator condenser 60 and pressuring the vapor 87. The compressor 90 can have compressor impeller 90a and stator 90b. The vapor 87 can be directed under pressure upwardly through channels 92 and 94 to plenum 96 (FIGS. 1 and 9) and then downwardly onto the condensing surfaces 72a of the evaporator condenser 60. The compressor 90 can compress the vapor 87 to a pressure, measured in water column height that is greater than a height of the condensing surfaces 72a and the annular condensing channels 72. The vapor 87 can be compressed by an amount, for example, about 0.8 lbs/in², that can provide a saturation temperature that is about 2° to 3° F., or about 2.5° F. above the boiling temperature of the liquid 19 or water in the evaporator 60a, so that the vapor 87 condensing on the condensing surfaces 72a can transfer heat through the cylinders 64 to the evaporation surfaces 66a on the opposite side of the cylinders 64 to efficiently provide heat for aiding evaporation of liquid 19.

The rotor 118 can additionally include a distillate pump 104, for receiving distillate 17 extracted by the movable extractor device 62 via rotating manifold 100, through rotating seal 101 (FIG. 9), reservoir inlet 103, reservoir 105 and through entrance 102a to a stand pipe 102. The stand pipe 102 can be fluidly connected to distillate pump 104, where the distillate 17 can be pumped upwardly to the heat exchanger device 24 through a conduit or channel 106 fluidly connecting the distillate pump 104 at pump outlet 104a with the distillate inlet 42a of counterflow heat exchanger 24b. The distillate 17 then exits the heat exchanger device 24 and the distiller 10 at a reduced temperature, through outlet 20b, having exchanged some of its heat that was originally close to the boiling point of 212° F. with incoming liquid 19 within the heat exchanger device 24. The distillate pump 104 can be a centrifugal pump.

The rotor 118 can further include a concentrate pump 55 for pumping heated concentrate liquid 15 upwardly from the sump 52 to the heat exchanger device 24 through a conduit or channel 55a that is connected between the concentrate pump 55 and the concentrate inlet 40a of counterflow heat exchanger 24b. The concentrate 15 can be made up of incoming heated liquid 19 that is in sump 52 and evaporated to have a higher concentration of materials, substances or particles. The concentrate 15 can either be periodically removed, or continuously removed, so that the liquid 19 in the sump 52 maintains a generally consistent level of materials, substances or particles. The heated concentrate 15 also exchanges heat with the incoming liquid 19 within heat exchanger device 24, before exiting the distiller 10 through concentrate outlet 20c. The particular locations of the pump 54, compressor 90, pump 104 and pump 55 on the rotor 118 can differ if desired to suit the situation at hand.

The vertical shaft 120 about which rotor 118 rotates, can be formed of ceramic, and can be hollow with a vertical internal cavity 125 which is sealed by seal 128 at a lower end to prevent leakage below. The seal 128 can be a dynamic seal for sealing during rotation when centrifugal forces open a slight clearance between the inner part of the seal and the vertical shaft 120, and can be act as a static seal when at rest when the seal makes contact with vertical shaft 120. The internal cavity 126 can be filled at the top or upper portion of shaft 120 with distillate 17 circulated from pump 104 fluidly connected thereto, or other suitable pumping source. The shaft 120 can include a series of upper and lower lateral ports, holes, channels or passages 130a and 130b, extending laterally or radially from the internal cavity 126 to the exterior surface of the shaft 120 below each bearing 124 and 122. The bearings 124 and 122 can engage the shaft 120 at upper and lower portions. The bearings 124 and 122 can be sleeve bearings that can be formed of a material such as ceramic of composite material, and can be fixed to upper and lower portions of rotor 118, but rotatable about shaft 120. The distillate 17 flows through the passages 130a and 130b to the outer surface of shaft 120, and can flow upwardly to lubricate bearings 124 and 122, with a quantity of distillate 17 between the exterior surface of the shaft 120 and the interior surface of the bearings 124 and 122, forming a thin film of distillate lubricant therebetween. The distillate 17 from passages 130a flows upwardly into annular gap 132 between the shaft 120 and rotor 118, driven by the high centrifugal force generated by rotation of the rotor 118, which creates a steep sided parabolic bowl of distillate 17, eventually joining distillate 17 from passages 130*b*, and both flowing to lubricate bearing 122. The distillate 17 can then enter inlet 134 of pump 104 for recirculation back into internal cavity 126. The distillate 17 flow can be sufficient to cool bearings 122 and 124, but minimized to conserve pumping energy.

The rotating surfaces and mechanisms of the rotor 118, including pump 54, compressor 90, pump 104 and pump 55, can be sealed with non-contact dynamic seals and rotate on water or distillate lubricated bearings, which can slightly leak water or distillate 17, which if not dealt with, can be problematic. A seal 135 is generally designated on rotor 118, and can be associated with any of the rotating surfaces and mechanisms, including pump 104. The sealed vertically oriented housing 12 and dewar 14 design with the opening 14*d* at the top and the sump 52 located at the bottom 14*e*, allows leaked water or distillate 17 to flow downwardly within the sealed dewar 14 into the sump 52 where it can mix with the incoming liquid 19 and be pumped by pump 54 to the evaporator condenser 60 for distillation as well as be pumped by pump 55 for removal with the concentrate 15. As a result, expensive sealing arrangements are not needed for sealing the rotary components since the leaked liquids can be dealt with by being directed into the sump 52 for further processing.

Referring back to FIGS. 1 and 6-9, the evaporator condenser 60 can be positioned and mounted concentrically within the interior 18 of housing 12 and dewar 14 along axis A, to be thermally insulated by the dewar 14. The evaporator condenser 60 can have a series of concentric elongate cylinders or cylindrical members 64 which can be positioned vertically or upright about its axis $X_2$, which can be along axis A. The evaporator condenser 60 can be generally elongate and cylindrical or annular in shape, having an outer cylindrical member 64*a* and an inner cylindrical member 64*b*. A mounting flange 61*a* can be connected to the top of outer cylindrical member 64*a* and a mounting flange 61*b* can be connected to the bottom of inner cylindrical member 64*b*, for mounting within the dewar 14 and housing 12. Flange 61*a* can be relatively rigid and flange 61*b* can be relatively elastic. The evaporator condenser 60 has at least three upright cylindrical members 64 to form an evaporator 60*a* with at least one elongate annular evaporation chamber or channel 66 having opposed circular or curved concave and convex evaporation surfaces 66*a* facing each other, and a condenser 60*b* with at least one elongate annular condensing chamber or channel 72 having opposed circular or curved concave and convex condensing surfaces 72*a* facing each other.

The embodiment depicted in FIGS. 6 and 7, has a series of 15 elongate concentric evaporator condenser cylinders or cylindrical members 64, which can be made of metal, forming an evaporator 60*a* with a series of 7 concentric annular evaporation channels 66, and a series of 7 concentric annular condensing channels 72, arranged in alternating radial fashion. It is understood that the number of cylindrical members 64 can vary depending upon the situation at hand. The alternating series of adjacent annular evaporation 66 and condensing channels 72 have evaporation and condensing surfaces 66*a* and 72*a*, which are on opposite sides or surfaces of the walls of the cylindrical members 64, one facing radially inwardly and the other facing radially outwardly. As a result, each adjacent evaporation channel 66 and condensing channel 72 has a common wall formed by a cylindrical member 64, separating them, with one side or surface of the common cylindrical member 64 having an evaporation surface 66*a* and the other side or surface having a condensing surface 72*a*. Therefore, a series of alternating adjacent evaporation 66 and condensing 72 channels can have common cylindrical members 64 therebetween and forming the opposed evaporation 66*a* and condensing surfaces 72*a*. The annular evaporation channels 66 can each have a sealed upper annular wall 68 at the upper end for sealing the top of the evaporation channels 66, while having an open annular bottom entrance 66*b* at the bottom end (FIG. 9). The annular condensing channels 72 can have a sealed annular bottom wall 70 for sealing the bottom end, while having an open annular upper entrance 72*b* at the upper end. The cylindrical members 64 can be formed from a suitable metal, for example cupronickel or titanium, and can be formed from sheets which can be cut to size, rolled and welded together and with walls 68 and 70, to form evaporation 66 and condensing chambers 72 with sealed ends, in a manner where there is minimal waste, which can be important with the cost of materials.

The cylindrical surfaces allow cylindrical members 64 with thin wall 63 thicknesses to be used while having a structural configuration that is strong enough to resist pressure of the vapor 87, and the pressure of wiping and scraping by the liquid applicator device 58 and the extractor device 62. Thin walled cylindrical members 64 allow heat to be readily conducted from the condensing pressurized vapor 87 condensing on the condensing surfaces 72*a* through the thin wall 63 to the evaporation surfaces 66*a* on the opposite surface or side. Each cylindrical member 64 has a different diameter $D_c$ from each other, but can have the same height $H_c$. The ratio $H_c$ to $D_c$ for the cylindrical members 64*a* can range from about 1.25-3.75 to 1. In some embodiments, the outer cylindrical member 64*a* can have a $H_c$ to $D_c$ ratio of about 1.4 to 1, and the inner cylindrical member 64*b* can have a $H_c$ to $D_c$ ratio of about 3.6 to 1. The spacing between the cylindrical members 64 can be kept to a minimum to provide sufficient evaporation and condensing surface area while being compact.

The rotary assembly 115 and compressor 90 can be positioned within the central interior region or cavity of the inner cylindrical member 64*b*, and heat generated by operation of the compressor 90, pump 54, pump 104, pump 55 and motor 116, can be absorbed by the surrounding evaporator condenser 60. The dewar 14 can surround the outer cylindrical member 64*a* with an evaporation gap 142 (FIG. 9) therebetween. By being located within the inner cylindrical member 64*b*, the compressor 90 is centrally located for drawing vapor from the annular evaporation channels 66 downwardly through the open bottom entrances 66*b* and radially inwardly, and then delivering the vapor 87 under pressure radially outwardly and downwardly to the annular condensing channels 72 through the open upper entrances 72*b*. The outer cylindrical member 64*a* can be in some cases in circumferential compression due to condenser pressure and stressed to the threshold of buckling.

The evaporator condenser 60 can have optimal heat transfer from the evaporator side of a cylindrical member 64 to the condensing side with a minimum temperature difference between the evaporation surfaces 66*a* and the condensing surfaces 72*a*. Heat can be further used efficiently while minimizing surface area in the evaporator condenser 60. When operating in a steady state, the only energy required to operate the distillation process can be the energy to run the rotary assembly 115 or motor 116. When starting the distiller 10, the rotary assembly 115 and motor 116 can be run to operate compressor 90, which then brings the distiller 10 up to operating temperature and begins distilling liquid 19. Separate heating elements are not required, but can be used in some embodiments to bring the distiller 10 up to operating temperature more quickly, or to maintain temperature during standby. The compressor 90 can pressurize the vapor 87 only a slight or small amount, such as by 0.8 lb/in$^2$, so that the saturation temperature in the condenser 60b is close to the saturation temperature of the evaporator 60a, which can be about a 2° or 3° F., or about 2.5° F. difference. The heat of the compressed vapor 87 and heat generated by the rotary assembly 115 and motor 116 can be efficiently retained within the dewar 14 due to the design and positioning of the dewar 14 and the distiller's 10 components, so that embodiments of the distiller 10 can generally run only on energy input to the rotary assembly 115 or motor 116. In some embodiments 99% or more of the heat of vaporization can be recycled.

In the evaporator condenser 60, a thin even film 86 of the liquid 19 can be applied on the evaporation surface 66a side of a cylindrical evaporator condenser member 64, and a thin film 97 of distillate 17 is allowed to condense on the condensing surface 72a side so that the conductivity through the two layers of film 86 and 97, which can be water, and the metallic layer of the wall 63, can be maximized. In general, each cylindrical evaporator condenser member 64 can have three thermal resistances in series, the film 86 of the liquid 19, such as water on the evaporation surface 66a side of the member 64, the metal wall 63 of the member 64, and the film 97 of the distillate 17, such as water, on the condensing surface 72a side of the member 64. The film 86 of the liquid 19 is made as thin as possible on the evaporation surface 66a side for rapid evaporation into vapor 87 that then can be compressed by compressor 90 to a slightly higher saturation temperature that condenses on the condensing surface 72a side into a very thin film 97 of distillate 17, which is removed as quickly as possible to avoid building up a larger heat resistive film 97 of distillate 17.

Referring to FIGS. 6-10, when applying liquid 19 to the evaporation surfaces 66a, liquid 19 from the sump 52 is pumped by pump 54 to rotatable manifold 56. At least one and usually a plurality or series of movable upright liquid applicator assemblies 85 are fluidly connected to the manifold 56, and can form the movable liquid applicator device 58, which can move or rotate in a circular motion.

The liquid applicator assemblies 85 can move in a circular path about axis A, for example, in a clockwise motion, between the evaporation surfaces 66a of the evaporation channels 66. Each liquid applicator assembly 85 can extend upwardly in an upright vertical manner into an annular evaporation channel 66 from the manifold 56 to about or close to the upper wall 68. The manifold 56 can be positioned above the sump 52 and just below the evaporator condenser 60, under the open annular bottom entrances 66b of the evaporation channels 66. An evaporator condenser 60 having a series of 7 annular evaporation channels 66 can have an equal number or series of 7 corresponding liquid applicator assemblies 85, one per evaporation channel 66. Each assembly 85 can have an elongate vertical or upright liquid supply passage channel or conduit 74 that is in fluid communication with the manifold 56 and extending close to the upper wall 68 for directing fluid 19 upwardly in the supply conduit 74 and into the evaporation channel 66 along the height of the evaporation channel 66. The liquid supply conduit 74 can be spaced between the opposing evaporation surfaces 66a and can have an upper opening 74a near the upper wall 68, as well as a series of intermittently spaced side or lateral ports, holes or openings 74b on opposite sides of the liquid supply conduit 74, which can extend the length of the conduit 74, and face the opposed evaporation surfaces 66a for evenly distributing the liquid 19 onto the opposite evaporation surfaces 66a along the height of the evaporation channel 66 and the evaporation surfaces 66a (FIGS. 8 and 9). The space between the liquid supply conduit 74 and the evaporation surfaces 66a can form vertical irrigation channels 76 within which the delivered liquid 19 can fall or flow in a stream to cover the height of the evaporation surfaces 66a. Elongate retaining structures 78 can extend from the forward side or front of the liquid supply conduit 74 relative to the direction of travel 79, and from the rearward side or back of the liquid supply conduit 74. The retaining structures 78 can have a corrugated shape with corrugations 78b to provide elongate vertically extending or upright retaining grooves or recesses 78a on opposite sides for retaining two opposing upright or vertical scraper members or blades 80 on the front, and two opposing upright or vertical wiper members or blades 82 on the rear. The supply conduit 74 and retaining structures 78 can be integrally formed together, such as an extrusion, or such as from plastic, polymer, other suitable material, or can be an assembly of formed metal strips.

The scraper 80 and wiper 82 blades can each have a generally semicircular cross section with a curved, circular or semicircular rear surface 80a and 82a (FIGS. 11-17), which can engage corresponding mating curved, circular or semicircular elongate retaining recesses 78a, formed in the retaining structures 78 by the corrugations 78b. The mating curved surfaces 80a, 82a, and 78a, which can curve around axes parallel to axis A, can allow rocking motion or movement of the scraper 80 and wiper 82 blades within the recesses 78a when engagably moved in contact across the opposing evaporation surfaces 66a in the direction 79 with appropriate force with the viscous drag of the liquid 19 during operation. This can cause rocking of the curved surfaces of the scraper 80 and wiper 82 blades so that the lengths can form optimized driver sealed upright or vertical contact lines 80d and 82d with the opposed evaporation surfaces 66a, and form sealed edges for the vertical irrigation channels 76, while moving across the evaporation surfaces 66a. In addition, the curved rear surfaces 80a and 82a of the scraper 80 and wiper 82 blades can be driven against the corresponding curved surfaces of the retaining recesses 78a to also form upright or vertical elongate driven seals therebetween, to prevent or minimize leakage between the scraper 80 and wiper 82 blades, and the recesses 78a. The scraper 80 and wiper 82 blades can have generally flat surfaces riding against the evaporation surfaces 66a and can be driven at about a 45° angle, which allows movement in and out of the retaining recesses 78a which can conform to varying gaps while retaining a seal, or compensating for wear. This can also minimize contact forces normal to the evaporation surfaces 66a to minimize friction. The corresponding shapes of the blades and the recesses 78a can maintain a position of the retaining structure 78 near the center between the opposed evaporation surfaces 66a. The angle of contact can be greater when the blades are pushed deeper into recesses 78a, and then tend to ride outward by pushing the retaining structure 78 toward the center between the evaporation surfaces 66a while moving in direction 79.

The corrugations 78b of the retaining structures 78 can allow a thin wall thickness to be used, but also provide strength and rigidity to the retaining structures 78 along its elongate vertical length which can provide resistance to bending or flexing of the scraper 80 and wiper 82 blades, to ensure consistent contact with the opposed evaporation surfaces 66a. The scraper blades 80 and the wiper blades 82 can be positioned close to the liquid supply conduit 74 in the travel direction 79. The corrugations 78b also can retain opposed scraper 80 and wiper 82 blades in a slightly staggered arrangement in the direction of travel, which can minimize the width of the liquid applicator assembly 85 and spacing between the opposed surfaces 66a. The scraper 80 and wiper 82 blades can position the liquid supply conduit 74 between the two opposing evaporation surfaces 66a generally in a central location, or along the centerline of travel along the circular path. The corrugations 78b and the liquid supply conduit 74, can provide the liquid applicator assembly 85 with stiffness in the vertical direction along the length, but can have a thin wall to allow the retaining structures 78 to be shaped to conform to the shape or curve of the path between the opposed evaporation surfaces 66a of the annular evaporation channel 66. Positioning the retaining structures 78, blades 80 and 82, and conduit 74 close together in the direction 79 can minimize the amount of bending that is required in the design and can allow for one shape to be used in more than one annular evaporator channel 66.

In use, a liquid applicator assembly 85 can move within each annular evaporation channel 66 in a circular path about axis A and in unison with each other and manifold 56, in the direction of arrows 79 (FIG. 8). The applicator assemblies 85 can be positioned at the same or different angular positions relative to each, but often are in the two groups, 180° apart from each other. FIG. 8 depicts only one applicator assembly 85 for simplicity. The opposed scraper blades 80 on the front can simultaneously scrape any residual films 84 on the opposed evaporation surfaces 66a prior to applying the liquid 19 from the moving liquid supply conduit 74 while moving in the direction of arrows 79. The residual films 84 can include liquid 19 that has not fully evaporated, as well as contaminants, scale, particulates, precipitants, etc., left behind by the evaporated liquid 19. Scraping the residual films 84 can maintain consistent heat transfer on the evaporation surfaces 66a, and can also aid in applying a consistent film 86 of liquid 19 for rapid evaporation. After the residual film 84 is removed, which can flow down to the sump 52 after scraping, the liquid 19 is applied to the opposed evaporation surfaces 66a by the liquid supply conduit 74. The amount of liquid 19 on the evaporation surfaces 66a at this point can be inconsistent so that the opposed wiper blades 82 which closely follow can simultaneously wipe and apply the liquid 19 into a thin even film 86 on the opposed evaporation surfaces 66a for quick evaporation. The wiper blades 82 can form a seal along the line of contact 82d to apply a thin even film 86 of liquid 19 that is between 0.0008 to 0.005 inches thick, and often about 0.0008 to 0.002 inches thick, and can be only 0.001 inches thick. The liquid applicator assemblies 85 can rotate with the manifold 56 at about 20-80 revolutions/min, or in some cases, about 30-60 revolutions/min. In the time between passes by the liquid applicator assemblies 85, the film 86 of liquid 19 evaporates and the residual film 84 is scraped off by the scraper blades 82. In the residual film 84, as the concentration of contaminants increases with evaporation, certain contaminants will come out or precipitate out of solution, and can form on the surface of the film 84, which can be effectively scraped off by the scraper blades 80. The film 84 can be a fraction of a thousandth of an inch thick. An even thinner film can be left behind that provides lubrication for the scraper or wiper. The thinner residual film left behind has fewer contaminates than the film 84 because most of the contaminants were on the surface that was removed.

Figure 12:
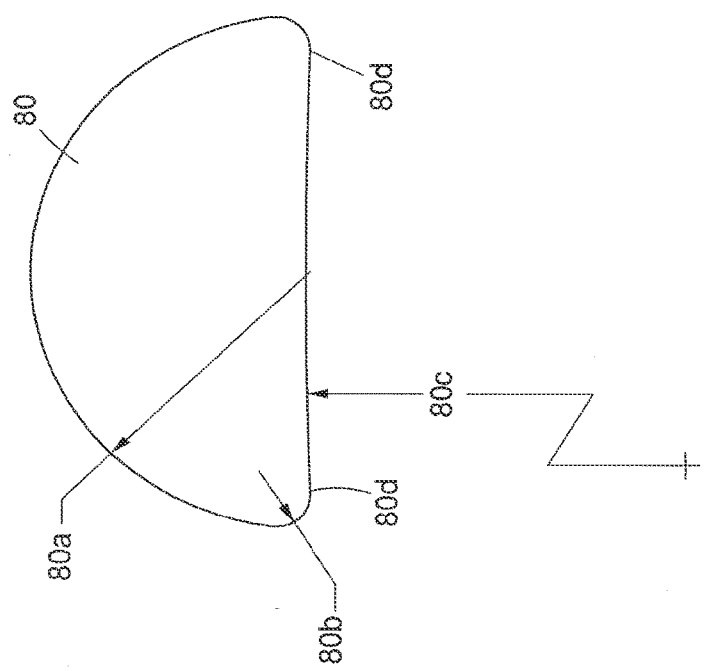
FIG. 12 is an end view of the scraper blade of FIG. 11.
Figure 11:
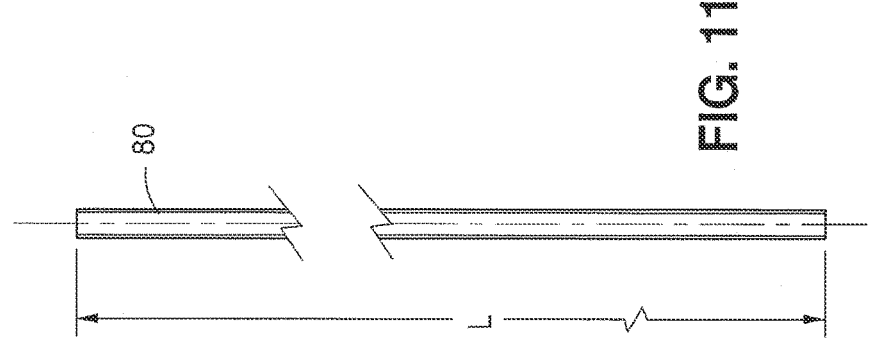
FIG. 11 is a side view of an embodiment of a scraper blade for a liquid applicator assembly.
Figure 15:
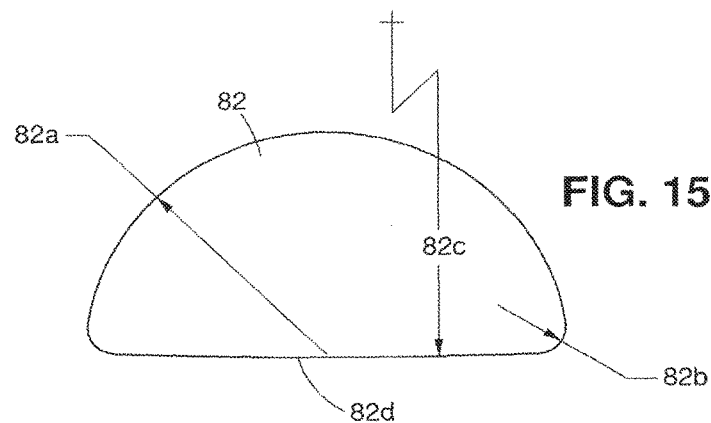
FIG. 15 is an end view of the wiper blade of FIG. 13.
Figure 16:
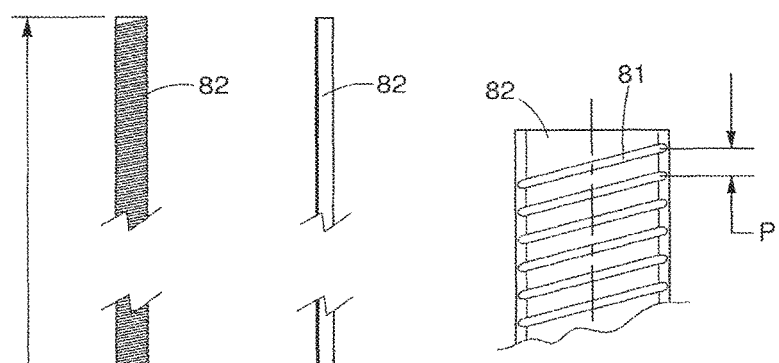
FIG. 16 is an enlarged view of a portion of FIG. 13.
Figures 13, 14:
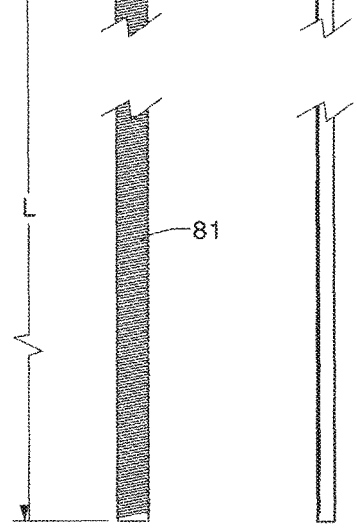
FIG. 13 is a side view of an embodiment of a wiper blade for a liquid applicator assembly.
FIG. 14 is an edge view of the wiper blade of FIG. 13.
Figure 17:
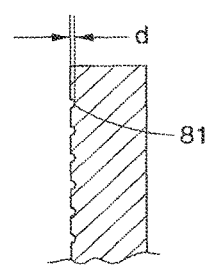
FIG. 17 is a sectional view of a portion of the wiper blade of FIG. 13.

Referring to FIGS. 11 and 12 scraper blades 80 can have a length L that is close to the height of the annular evaporation channels 66. The scraping face 80c can have a slight concave radius to form two upright or vertical elongate scraping lines of contact 80d with the evaporation surfaces 66a for scraping the residual film 84. The corners 80b can be radiused or rounded. Scraper blades 80 can be formed of polymeric material, ceramics or metal. In one embodiment the scraper blades 80 can be made of polyetheretherketone (PEEK) and can have a length L this is about 14 inches long, a width that is about 0.15 inches, and a thickness of about 0.075 inches.

Referring to FIGS. 13-17, wiper blades 82 can be made of the same material and can have a length L, width and thickness that is the same as the scraper blades 80. The wiping face 80c can have a slight convex radius to form an upright or vertical line of contact 82d with the evaporation surfaces 66a. Corners 82b can be radiused or rounded. The wiping face 80c can have a series of intermittent openings, grooves or recesses 81 along the length to distribute the liquid 19 for application. The openings 81 can be at a slight angle, for example 15° and spaced apart by a pitch P that is close enough together so that streams of liquid 19 passing through when wiped quickly merge together to achieve the desired film thickness, such as in about 0.3 seconds or less. The openings 81 can be spaced apart from each other by a pitch P of about 0.02 to 0.1 inches apart, such as 0.030 inches, and can have a depth d of about 0.004 inches. The seal along the line of contact 82d can ensure that the liquid 19 passes through the openings 81, for film thickness control. In some embodiments the openings 81 can be omitted. In addition, in some embodiments, the scraper and wiper blades can have angled surfaces for forming contact lines and for engaging appropriately shaped recesses of the retaining structures 78.

Referring to FIGS. 1 and 6-9, at least one and usually a plurality or series of movably upright distillate extractor assemblies 95 of distillate extraction device 62 can move or rotate about axis A, within the annular condensing channels 72 between the condensing surfaces 72a in a circular motion or path, in the direction of arrows 79, such as in the clockwise direction. Each extractor assembly 95 can extend in an upright vertical manner downwardly into an annular condensing channel 72 from a rotating manifold 100. The manifold 100 can be part of the extraction device 62 and can be positioned above the evaporator condenser 60, over the open annular upper entrances 72b of the condensing channels 72. An evaporator condenser 60 having series of 7 concentric annular condensing channels 72 can have an equal number or series of 7 corresponding distillate extractor assemblies 95, one per condensing channel 72. Each extractor assembly 95 can have an elongate upright or vertical retaining structure 108 which can be corrugated with corrugations 108b to provide upright or vertical elongate retaining grooves or recesses 108a extending on opposite lateral sides for retaining two opposing upright or vertical scraper members or blades 110. The length of the opposed scrapper blades 110 can engagably move in contact across opposing condensing surfaces 72a for scraping the film 97 of distillate 17 off the opposing condensing surfaces 72a, simultaneously along contact lines 110d therebetween (FIG. 8). The corrugations 108b can provide recesses 108a which are staggered or slightly staggered in the direction of movement 79.

The retaining structure 108 and scraper blades 110 can be positioned forward in the direction 79 of an upright or vertical distillate extraction conduit, tube or channel 98 that is connected to the retaining structure 108. The distillate extraction channel 98 can have a lower entrance opening or inlet 98*a* at about the bottom end of the condensing channel 72 near the bottom wall 72, and an upper exit opening or outlet 98*b* connected to and in fluid communication with a manifold 100. Distillate 17 scraped from the opposed condensing surfaces 72*a* falls or flows downwardly to the bottom of the condensing channel 72. The distillate 17 collecting at the bottom or bottom wall 70 of the condensing channel 72 that rises and reaches the inlet 98*a* can be forced out of the condensing channel 72 upwardly through the extraction channel 98 by the pressure of the vapor 87 within the condensing channel 72, and into the manifold 100 through outlet 98*b*. The flow of distillate 17 up through extraction channel 98 can be aided by the distillate pump 104 or other suitable pump, which can create a suction on the extraction channel 98. Movement of the distillate 17 up through the extraction channel 98 to manifold 100 and back down through rotating seal 101, reservoir inlet 103 and into reservoir 105 to pump 104, can create a siphon action to further aid the flow of the distillate 17, and can help minimize the energy input required for creating such a flow.

An upright or vertical noncondensable gas extraction passage, tube, channel or conduit 112 can be positioned behind, in back of, or at the rear of the distillate extraction channel 98 by a thin connecting web, wall or member 111. The retaining structure 108, extraction channel 98 and the extraction channel 112 can be integrally formed together, such as an extrusion, and can be formed of a suitable material such as plastic or polymeric materials, or an assembly of formed metal strips. The corrugations 108*b* of the retaining structure 108 and the extraction channels 98 and 112, can provide the distillate extraction assembly 95 with stiffness in the vertical direction along the length, which can provide resistance to bending or flexing of the scraper blades 110, to ensure consistent vertical contact with the opposed condensing surfaces 72*a*. At the same time, the retaining structure 108 and the connecting web 111 can have a thin wall to allow the retaining structure 108 and the connecting web 111 to be shaped and fit into narrow condensing channels 72. Positioning the scraper blades 110 and extraction channels 98 and 112 close together in the direction 79 can minimize the amount of bending needed to conform to the curve of the annular condensing channel 72, in the design and can allow for one shape to be used in more than one condensing channel 72.

The noncondensable gas extraction channel 112 can have a lower inlet 112*a* (FIG. 9) near the bottom wall 70 or the bottom end of the condensing channel 72, which can be above the inlet 98*a* of the distillate extraction channel 98. Noncondensable gases 13 within the condensing channel 72 near the bottom end can enter the inlet 112*a* and can be forced upwardly through the noncondensable gas extraction channel 112 out of the condensing channel 72 by the pressure of the vapor 87 within the condensing channel 72. The noncondensable gas extraction channel 112 can be fluidly connected to passages in manifold 100 which can be connected in turn by suitable passages to exhaust gas outlet 20*d* (FIG. 1), so that the noncondensable gases 13 can be exhausted from the distiller 10. The noncondensable gases 13 can include dissolved gases in the incoming liquid 19 that come out of solution.

Referring to FIGS. 18-20, the scraper blades 110 can have a length L that is similar to scraper blades 80, and close to the height of the annular condensing channels 72. The scraping face 110*c* can have a slight convex radius to form an upright or vertical elongate scraping line of contact 110*d* with condensing surfaces 72*a* for scraping the film 97 of distillate 17 from the condensing surfaces 72*a*. The corners 110*b* can be radiused or rounded. The axial ends can have protrusions 110*e* to aid in assembly. The scraper blades 110 can have a generally semicircular cross section with a curved, circular or semicircular rear surface 110*a* which can engage corresponding mating curved, circular or semicircular elongate retaining recesses 108*a*, formed in the retaining structure 108 by the corrugations 108*b*. The mating curved surfaces 110*a* and 108*a*, which can curve around axes parallel to axis A, can allow rocking motion or movement of the scraper blades 110 within the recesses 108*a* when engagingly moved in contact across the opposing condensing surfaces 72*a* in the direction 79 with appropriate force with the viscous drag of the distillate 17. This can cause rocking on the curved surfaces of the scraper blades 110 so that the lengths can form optimized driver sealed vertical or upright contact lines 110*d* with the opposed condensing surfaces 72*a* for scraping distillate 17 from the condensing surfaces 72*a*. As can be seen, scraper blades 110 can operate in a similar manner as blades 80 and 82, and can center each distillate extractor assembly 95 within a condensing channel 72, and can be formed of the same or similar materials. In one embodiment, scraper blades 110 can have a length L of about 14 inches, a width of about 0.125 inches, and a thickness of about $\frac{1}{16}$ of an inch. In some embodiments, the scraper blades 110 can have angled scraping and rocking surfaces, and the retaining recesses 108*a* can be shaped appropriately.

An evaporator condenser 60 having cylindrical members 64 with a Hc to Dc (FIG. 6) ratio, as described, can provided substantial liquid 19 application and distillate 17 scraping for each revolution of the liquid applicator assemblies 85 and distillate extractor assemblies 95. Although the liquid applicator assemblies 85 and the distillate extractor assemblies 95 have been described to preferably rotate for applying liquid 19 and removing distillate 17, in some embodiments, a reciprocating motion can be used. In addition, in some embodiments, the opposed evaporation surfaces 66*a* and opposed condensing surfaces 72 do not have to be cylindrical and can have a partial curve or can be flat.

Referring to FIG. 1, the rotating manifolds 56 and 100 can be connected together so that the rotation of the manifolds 56 and 100, and the liquid applicator device 58 and the distillate extraction device 62, can be synchronized and driven together in unison. The top manifold 100 can be driven by a motor, which can be in rotary assembly 115, motor 116, or by a water motor 117 shown as an example in FIG. 21. The top manifold 100 that is connected to the distillate extraction device 62 is preferably driven since the rotating components can be lubricated with distillate, while the lower manifold 56 that is connected to the liquid applicator device 58 is in a contaminated sump environment.

Referring to FIGS. 1 and 21-23, a transmission 145 can rotatably drive the liquid applicator assemblies 85 and distillate extractor assemblies 95 in unison. The rotation of the manifold 100 and the distillate extraction device 62 can drive a drive ring gear 136*a* (FIG. 9) connected thereto. The ring gear 136*a* can drive a set of four planet drive gears 138*a*. Gears 138*a* rotate four corresponding planet driven gears 138*b* via rotatable or rotating connecting shafts 140*a*, which extend through or penetrate a separating partition wall 142, and can be rotatably mounted by bearings 140*b* that are mounted to wall 142. The driven gears 138*b* drive a driven ring gear 136*b*. Axially extending connecting members 114 are connected to the driven ring gear 136*b*, and extend to and are further connected to the lower manifold 56, to drive the lower manifold 56 and the liquid applicator device 58 in unison with the top manifold 100 and the distillate extraction device 62. The sets of planet drive gears 138*a* and driven gears 138*b*, can be evenly spaced apart from each other, centering the ring gears 136*a* and 136*b*, the distillate extraction device 62, the distillate extractor assemblies 95, the liquid applicator device 58, and the liquid applicator assemblies 85, relative to each other, by utilizing the sets of planet gears as rollers. The planet gears 138*a* and 138*b* can be lubricated with distillate 17. The sets of planet gears 138*a* and 138*b* can have at least three sets of gears evenly spaced apart. The partition wall 142 can separate pressurized and nonpressurized regions of the interior 18 of the distiller 10 from each other. The axially extending connecting members 114 can fit into sockets at one or both ends for easy assembly and disassembly.

Figure 21:
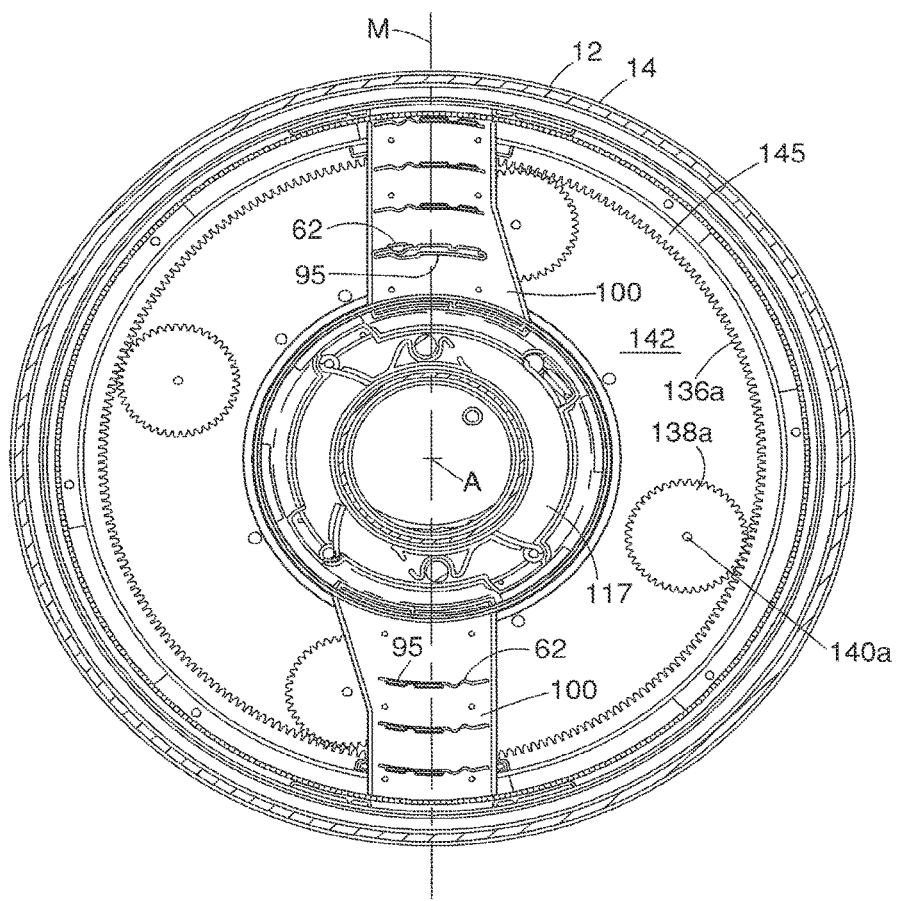
FIG. 21 is a cross sectional view of FIG. 1 looking upwardly at the top or upper manifold for the distillate extraction device.
Figure 22:
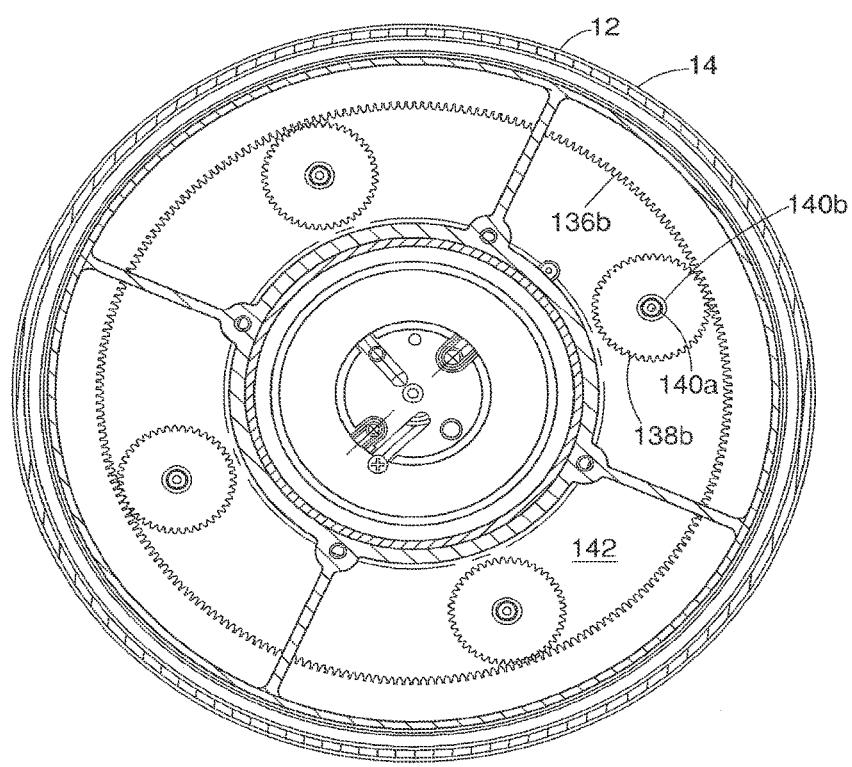
FIG. 22 is a cross sectional view of FIG. 1 looking downwardly at the driven gears above a wall partition that is above the upper manifold.
Figure 23:
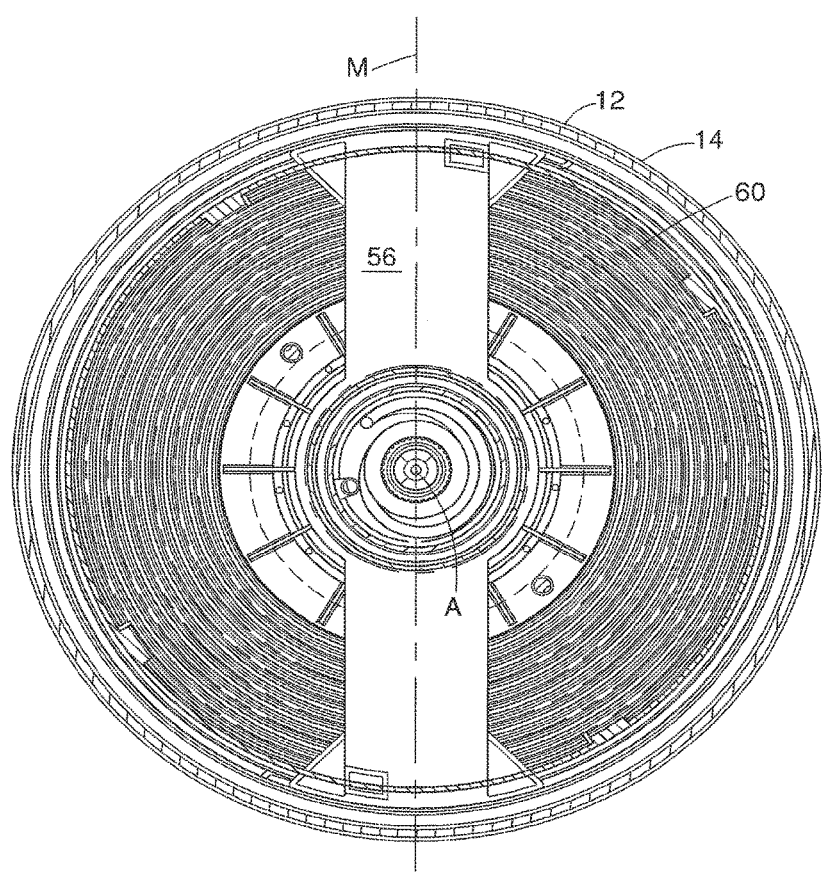
FIG. 23 is a cross sectional view of FIG. 1 looking upwardly at the lower or bottom manifold for the liquid applicator device.
Figure 24:
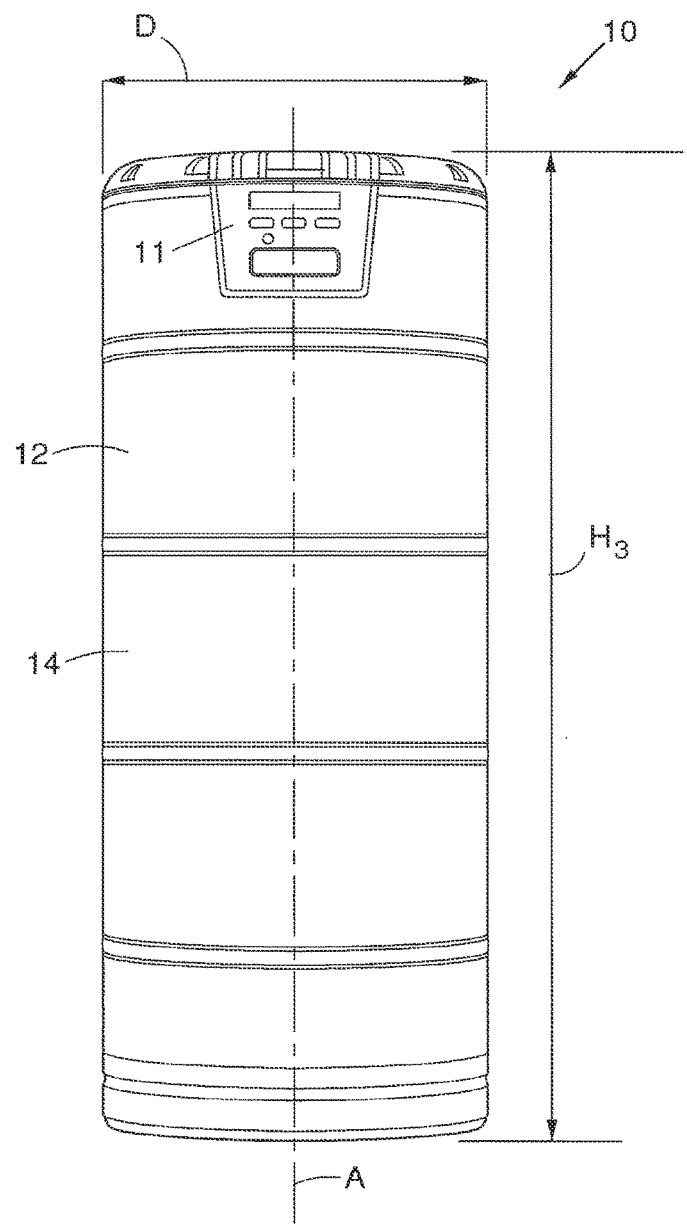
FIG. 24 is a front view of an embodiment of a housing and distiller in the present invention.
Figure 25:
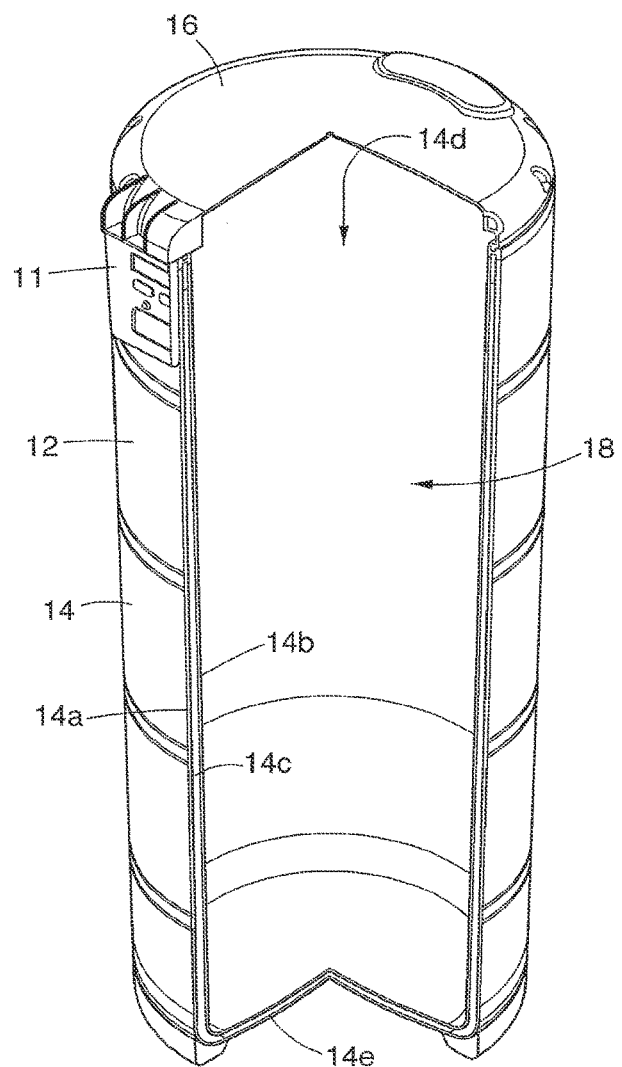
FIG. 25 is a perspective view of the housing of FIG. 24 with a portion broken away.
Figure 26:
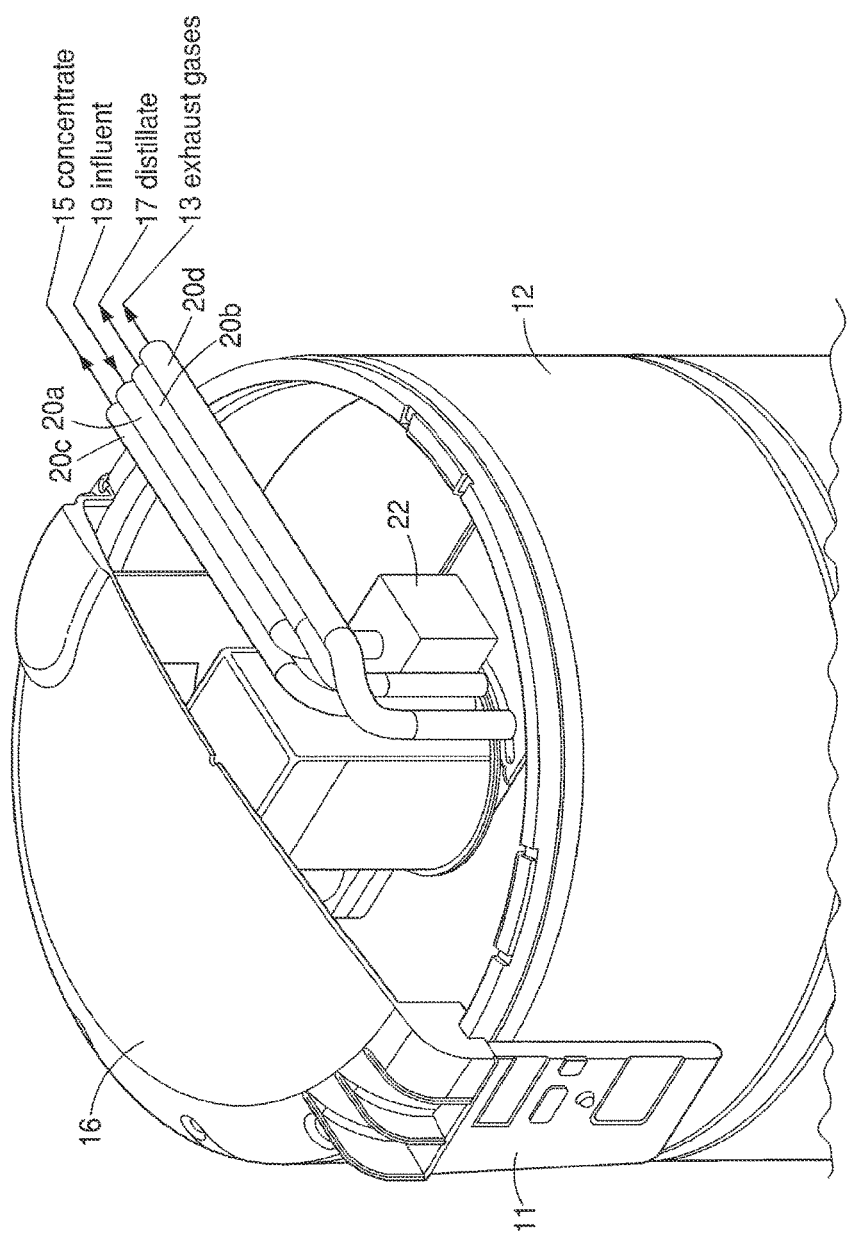
FIG. 26 is a perspective view of the top of the distiller of FIG. 24 with a portion of the top cap broken away showing an arrangement of inlet and outlets.
Figure 27:
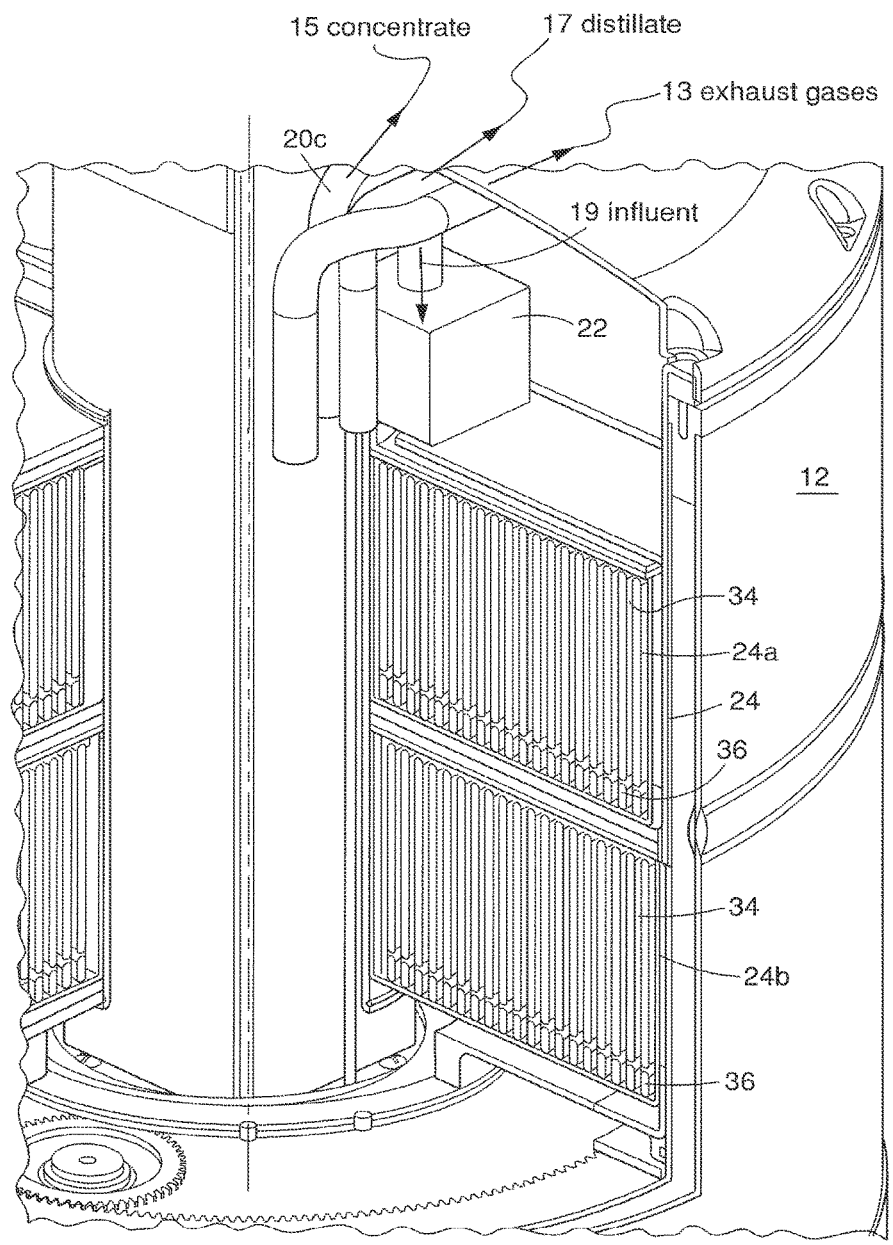
FIG. 27 is a perspective sectional view of a portion of the top of the distiller of FIG. 24 showing an embodiment of a heat exchanger device.

The manifolds 100 and 56 can each have two radially extending arms, radially extending from axis A along a central axis M. Referring to FIG. 21, the distillate extractor assemblies 95 of the distillate extraction device 62 can be mounted to the manifold 100 along axis M, generally evenly, four distillate extractor assemblies 95 on one side of axis A and three on the opposite side. Referring to FIG. 23, the liquid applicator assemblies 85 of the liquid applicator device 58 can be mounted to the manifold 56 along axis M in a similar manner. The assemblies 85 and 95 can be arranged in an alternating fashion. In some embodiments, the manifolds 56 and 100 can have other suitable shapes and the assemblies 85 and 95 can be mounted in other suitable configurations and numbers, for example, more than one per channel 66 and 72.

Figure 28:
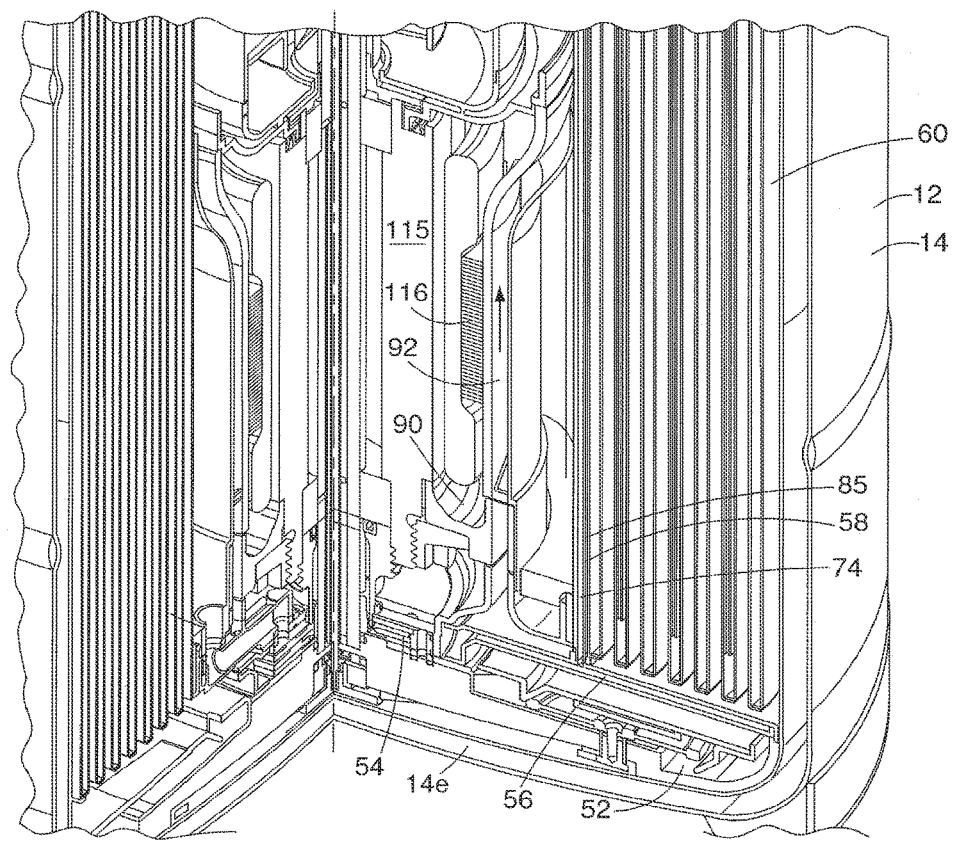
FIGS. 28 and 29 are perspective sectional views of portions of the bottom of the distiller of FIG. 24.
Figure 29:
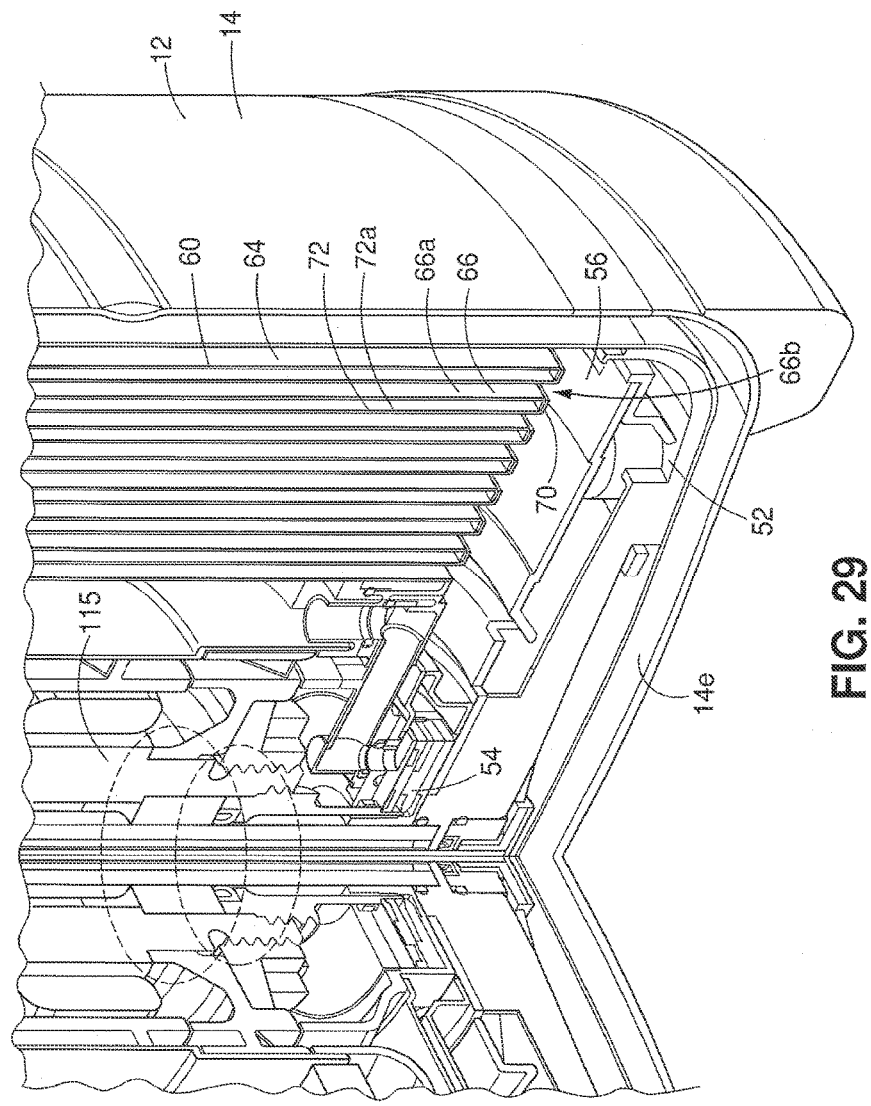

FIGS. 24-27 depict another embodiment of the distiller 10, showing the housing 12, dewar 14, and a particular arrangement of the inlet 20*a*, outlets 20*b*, 20*c* and 20*d*, inlet valve 22, and electronics 11 for controlling the operation of the distiller 10. Conduits and other components can extend through the central cavity 32 of heat exchanger device 24. FIGS. 28 and 29 depict components near the bottom 14*e* of the dewar 14. The materials used in distiller 10 other than those described, can be those that are known in the art for distillers, and can include materials that are resistant to corrosion, thermally conductive, and thermally insulative.

Figure 30:
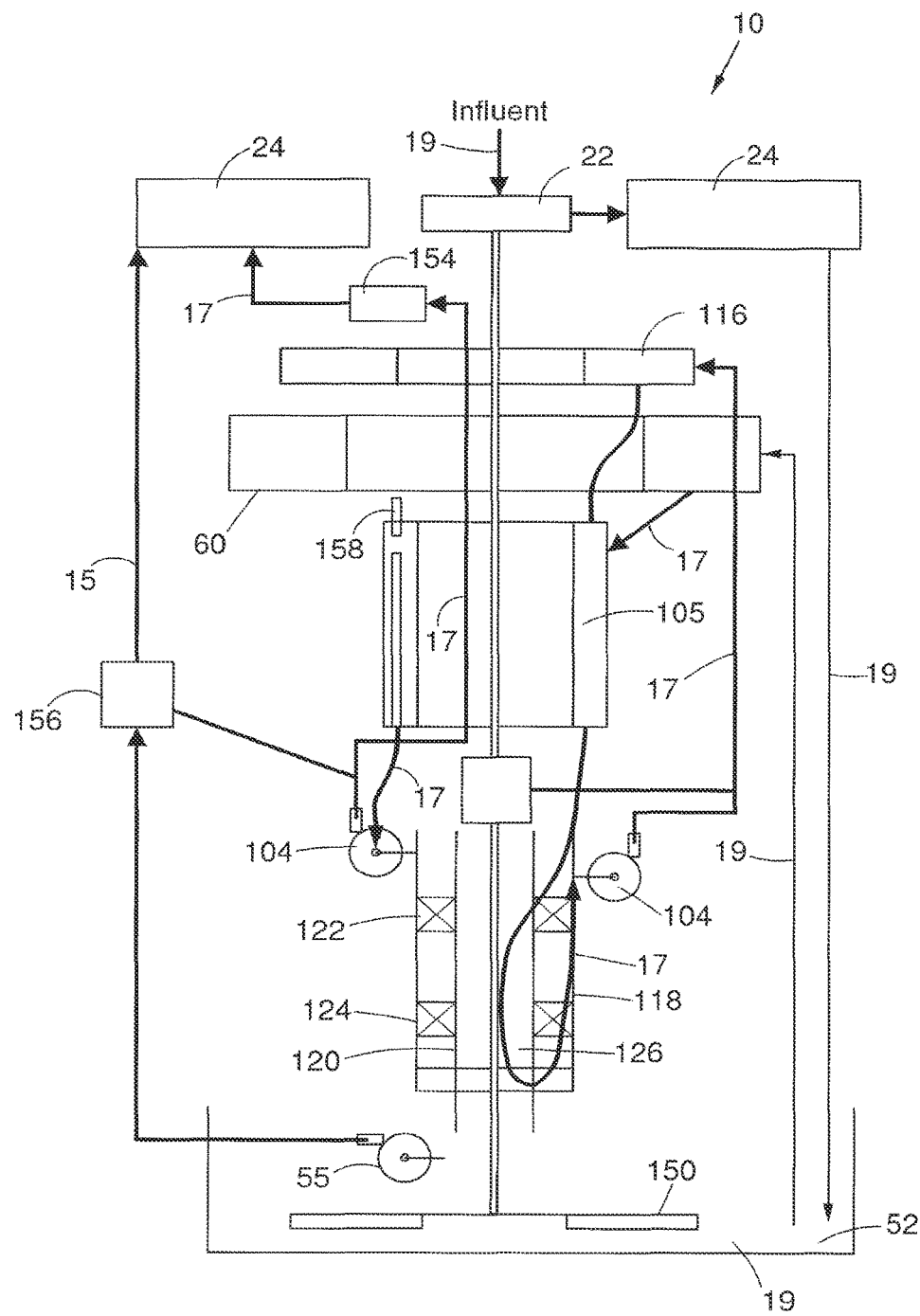
FIG. 30 is a schematic drawing depicting an embodiment of liquid flow paths in a distiller in the present invention.

FIG. 30 depicts an embodiment of a liquid flow path through distiller 10. Incoming or influent liquid 19 can enter inlet valve 22, and flow through heat exchanger device 24 to sump 52. A float 150 can control inlet valve 22 to control the flow of liquid 19 into distiller 10. Liquid 19 is applied to evaporator condenser 60. Distillate 17 can flow from evaporator condenser 60 into reservoir 105 to distillate pump 104. The distillate 17 can be pumped by distillate pump 104 through a check valve 154 out through heat exchanger device 24 to exit distiller 10. A vent 158 can be connected to reservoir 105. Concentrate 15 can be pumped by concentrate pump 55 through concentrate valve 156 and out through heat exchanger device 24 to exit distiller 10. Distillate 17 can enter internal cavity 126 of shaft 120 of rotary assembly 115 for lubricating bearings 124 and 122, and can also power water motor 117, and lubricate other moving and rotating components of the distiller 10. The distillate pump 104 or other suitable pump can provide the distillate 17 for lubricating purposes.

While this invention has been particularly shown and described with references to example embodiments thereof, it will be understood by those skilled in the art that various changes in form and details may be made therein without departing from the scope of the invention encompassed by the appended claims. For example, suitable orientations, materials, shapes and sizes for the components in the distiller can be used, other than those described.

What is claimed is:

1. A condenser arrangement for a distiller comprising:
a condenser for receiving vapor comprising at least one condensing surface for condensing the vapor into distillate, at least two opposing spaced apart upright condensing surfaces facing each other and sealed to form at least one condenser gap therebetween, the at least one condenser gap having a sealed bottom end, and an opening at an upper end;
a compressor for introducing the vapor under pressure into the upper end and downwardly into the at least one condenser gap, the vapor condensing on the upright condensing surfaces as a distillate; and
at least one extractor assembly having at least one scraper for moving over the at least one condensing surface and scraping distillate from the at least one condensing surface for collection, the at least one extractor assembly being upright and movable within the at least one condenser gap for removing the distillate from the at least one condenser gap, the at least one scraper for scraping distillate from the upright condensing surfaces for collection at the bottom end of the at least one condenser gap, the at least one extractor assembly also including a distillate extraction channel having an entrance opening at about the bottom end of the at least one condenser gap for entry of the distillate for removal from the condenser, the pressure of the vapor entering the at least one condenser gap capable of forcing the distillate upwardly through the extraction channel and out of the condenser.

2. The arrangement of claim 1 in which the at least two opposing spaced apart upright condensing surfaces are formed by at least two concentric elongate cylinders forming an annular condenser gap therebetween.

3. The arrangement of claim 2 in which the extractor assembly moves within the annular condenser gap in a circular path.

4. The arrangement of claim 1 in which the at least one extractor assembly includes a noncondensable gas extraction channel having an entrance opening near the bottom end of the at least one condenser gap for entry of noncondensable gases for removal from the condenser, the pressure of the vapor entering the at least one condenser gap capable of forcing the noncondensable gases upwardly through the noncondensable gas extraction channel and out of the condenser.

5. The arrangement of claim 1 further comprising a pump for creating suction on the distillate extraction channel for aiding the removal of the distillate from the condenser.

6. The arrangement of claim 1 in which the at least one extractor assembly has two upright scrapers for simultaneously scraping distillate from the opposing spaced apart condensing surfaces.

7. The arrangement of claim 6 in which the scrapers comprise elongate blades which are positioned within respective elongate recesses of the at least one extractor assembly, the elongate blades and the elongate recesses being shaped to move the scraper blades against the opposing spaced apart condensing surfaces along respective contact lines.

8. The arrangement of claim 7 in which the scraper blades and the elongate recesses, have curved surfaces that are shaped and sized to allow rocking movement of the scraper blades to optimize the contact lines.

9. The arrangement of claim 1 further comprising an evaporator for evaporating liquid into the vapor, thereby forming the distiller.

10. A condenser arrangement for a distiller comprising:
a condenser for receiving and condensing vapor comprising spaced apart upright condensing surfaces sealed to form at least one condenser gap therebetween, the at least one condenser gap having a sealed bottom end, and an opening at an upper end,
a compressor for introducing the vapor under pressure into the upper end and downwardly into the at least one condenser gap, the vapor condensing on the upright condensing surfaces as a distillate; and
at least one extractor assembly for removing the distillate from the bottom end of the at least one condenser gap, a distillate wherein the at least one extractor assembly comprises extraction channel having an entrance opening at about the bottom end of the at least one condenser gap for entry of the distillate for removal from the condenser, the pressure of the vapor entering the at least one condenser gap capable of forcing the distillate upwardly through the distillate extraction channel and out of the condenser.

11. A method of condensing in a distiller comprising:
receiving vapor on at least one condensing surface of a condenser for condensing the vapor into distillate, at least two opposing spaced apart upright condensing surfaces facing each other and sealed to form at least one condenser gap therebetween, the at least one condenser gap having a sealed bottom end, and an opening at an upper end;
introducing the vapor under pressure with a compressor into the upper end and downwardly into the at least one condenser gap, the vapor condensing on the upright condensing surfaces as a distillate; and
moving at least one extractor assembly having at least one scraper over the at least one condensing surface and scraping distillate from the at least one condensing surface for collection, the at least one extractor assembly being upright and movable within the at least one condenser gap for removing the distillate from the at least one condenser gap, the at least one scraper for scraping distillate from the upright condensing surfaces for collection at the bottom end of the at least one condenser gap, the at least one extractor assembly also including a distillate extraction channel having an entrance opening at about the bottom end of the at least one condenser gap for entry of the distillate for removal from the condenser, the pressure of the vapor entering the at least one condenser gap capable of forcing the distillate upwardly through the extraction channel and out of the condenser.

12. The method of claim 11 further comprising forming the at least two opposing spaced apart upright condensing surfaces with at least two concentric elongate cylinders which form an annular condenser gap therebetween.

13. The method of claim 12 further comprising moving the extractor assembly within the annular condenser gap in a circular path.

14. The method of claim 11 further comprising:
providing the at least one extractor assembly with a noncondensable gas extraction channel having an entrance opening near the bottom end of the at least one condenser gap for entry of noncondensable gases for removal from the condenser; and
forcing the noncondensable gases upwardly through the noncondensable gas extraction channel and out of the condenser with the pressure of the vapor entering the at least one condenser gap.

15. The method of claim 11 further comprising creating suction on the distillate extraction channel with a pump for aiding the removal of the distillate from the condenser.

16. The method of claim 11 further comprising simultaneously scraping distillate from the opposing spaced apart condensing surfaces with two upright scrapers of the at least one extractor assembly.

17. The method of claim 16 further comprising forming the scrapers with elongate blades which are positioned within respective elongate recesses of the at least one extractor assembly, the elongate blades and the elongate recesses being shaped to move the scraper blades against the opposing spaced apart condensing surfaces along respective contact lines.

18. The method of claim 17 further comprising configuring the scraper blades and the elongate recesses, with curved surfaces that are shaped and sized to allow rocking movement of the scraper blades to optimize the contact lines.

19. The method of claim 11 further comprising evaporating liquid into the vapor with an evaporator.

20. A method of condensing in a distiller comprising:
receiving and condensing vapor with spaced apart upright condensing surfaces of a condenser that are sealed to form at least one condenser gap therebetween, the at least one condenser gap having a sealed bottom end, and an opening at an upper end,
introducing the vapor under pressure with a compressor into the upper end and downwardly into the at least one condenser gap, the vapor condensing on the upright condensing surfaces as a distillate; and
at least one extractor assembly within the at least one condenser gap for removing the distillate from the bottom end of the at least one condenser gap, a distillate wherein the at least one extractor assembly comprises extraction channel having an entrance opening at about the bottom end of the at least one condenser gap for entry of the distillate for removal from the condenser, the pressure of the vapor entering the at least one condenser gap forcing the distillate upwardly through the distillate extraction channel and out of the condenser.

* * * * *

UNITED STATES PATENT AND TRADEMARK OFFICE
CERTIFICATE OF CORRECTION

PATENT NO. : 9,770,676 B2
APPLICATION NO. : 14/341127
DATED : September 26, 2017
INVENTOR(S) : William H. Zebuhr It is certified that error appears in the above-identified patent and that said Letters Patent is hereby corrected as shown below:

In the Claims

In Claim 10, Column 27, Line 16, delete "a distillate"

In Claim 10, Column 27, Line 17, insert -- a distillate -- after the word "comprises"

In Claim 20, Column 28, Line 46, delete "for"

In Claim 20, Column 28, Line 47, delete "a distillate"

In Claim 20, Column 28, Line 48, insert -- a distillate -- after the word "comprises"

Signed and Sealed this
Fifth Day of December, 2017

Joseph Matal
*Performing the Functions and Duties of the*
*Under Secretary of Commerce for Intellectual Property and*
*Director of the United States Patent and Trademark Office*